(12) United States Patent
Jamieson

(10) Patent No.: US 12,241,359 B2
(45) Date of Patent: Mar. 4, 2025

(54) METHODS AND SYSTEMS FOR DRILLING

(71) Applicant: Helmerich & Payne Technologies, LLC, Tulsa, OK (US)

(72) Inventor: Angus Lamberton Jamieson, Inverness (GB)

(73) Assignee: HELMERICH & PAYNE TECHNOLOGIES, LLC, Tulsa, OK (US)

( * ) Notice: Subject to any disclaimer, the term of this patent is extended or adjusted under 35 U.S.C. 154(b) by 0 days.

(21) Appl. No.: 18/329,113

(22) Filed: Jun. 5, 2023

(65) Prior Publication Data

US 2023/0313668 A1 Oct. 5, 2023

Related U.S. Application Data

(62) Division of application No. 17/074,282, filed on Oct. 19, 2020, now Pat. No. 11,702,923.

(Continued)

(51) Int. Cl.
*E21B 44/08* (2006.01)
*E21B 7/06* (2006.01)
(Continued)

(52) U.S. Cl.
CPC ............... *E21B 44/08* (2013.01); *E21B 7/06* (2013.01); *E21B 44/10* (2013.01); *G01V 1/48* (2013.01); *G01V 2210/66* (2013.01)

(58) Field of Classification Search
CPC . E21B 44/08; E21B 7/06; E21B 44/10; E21B 44/06; E21B 43/12; E21B 44/02;
(Continued)

(56) References Cited

U.S. PATENT DOCUMENTS 8,939,233 B2 * 1/2015 Edbury ............... E21B 44/06
175/26
9,879,490 B2 1/2018 Edbury et al.
(Continued)

FOREIGN PATENT DOCUMENTS

CA 3058741 A1 4/2021
WO 2007093436 A1 8/2007
WO WO-2012016045 A1 * 2/2012 ............ E21B 21/08

OTHER PUBLICATIONS

Scott Coffey and Austin Groover, Nabors Drilling Technologies "Improvements in Slide Quality and Execution Speed Through Automation" Copuright, pp. 1-10 (Year: 2019).*
(Continued)

*Primary Examiner* — Michael J Dalbo
*Assistant Examiner* — Kaleria Knox
(74) *Attorney, Agent, or Firm* — Kilpatrick Townsend & Stockton LLP

(57) ABSTRACT

Systems and methods of controlling drilling operations including Sliding With Indexing For Toolface (SWIFT) and Variable Weight Drilling (VWD) techniques. The methods and systems may include systems and devices for controlling the drilling operations, including systems and devices capable of automatically determining drilling parameters and setting operating parameters for drilling in a wellbore. The systems and methods may also determine a change in weight on bit and/or toolface, determine a timeframe for a weight on bit to be delivered to the bit, and/or determine a spindle change to modify the toolface. The systems and methods may also send control signals to apply the spindle change and/or block velocity change to correct any detected or anticipated toolface error.

20 Claims, 13 Drawing Sheets

Related U.S. Application Data

(60) Provisional application No. 63/069,601, filed on Aug. 24, 2020.

(51) Int. Cl.
  *E21B 44/10* (2006.01)
  *G01V 1/48* (2006.01)

(58) Field of Classification Search
  CPC .... E21B 7/10; E21B 7/00; G01V 1/48; G01V 2210/66
  See application file for complete search history.

(56) References Cited

U.S. PATENT DOCUMENTS

| | | | |
|---|---|---|---|
| 11,702,923 B2 | 7/2023 | Jamieson | |
| 11,879,321 B2 | 1/2024 | Jamieson et al. | |
| 2002/0120401 A1 | 8/2002 | Macdonald et al. | |
| 2009/0090555 A1* | 4/2009 | Boone | E21B 44/02 175/45 |
| 2009/0126994 A1 | 5/2009 | Tibbitts et al. | |
| 2010/0259415 A1 | 10/2010 | Strachan et al. | |
| 2017/0260822 A1 | 9/2017 | Edbury et al. | |
| 2019/0145240 A1* | 5/2019 | Benson | E21B 44/00 175/40 |
| 2019/0330968 A1 | 10/2019 | Boone et al. | |
| 2019/0345808 A1* | 11/2019 | Suryadi | E21B 43/12 |
| 2020/0248508 A1* | 8/2020 | Summers | E21B 7/10 |
| 2020/0256181 A1* | 8/2020 | Jamieson | E21B 7/00 |

OTHER PUBLICATIONS

U.S. Appl. No. 17/074,282, "Non-Final Office Action", Sep. 14, 2022, 21 pages.
U.S. Appl. No. 17/074,282, "Notice of Allowance", Mar. 1, 2023, 18 pages.
U.S. Appl. No. 17/074,282, "Supplemental Notice of Allowability", Mar. 21, 2023, 2 pages.
U.S. Appl. No. 17/583,122, "Non-Final Office Action", May 25, 2023, 21 pages.
PCT/US2021/071256, "International Preliminary Report on Patentability", Mar. 9, 2023, 9 pages.
PCT/US2021/071256, "International Search Report and Written Opinion", Dec. 29, 2021, 12 pages.
PCT/US2021/071256, "Invitation to Pay Additional Fees and, Where Applicable, Protest Fee", Oct. 5, 2021, 3 pages.
PCT/US2022/013574, "International Search Report and Written Opinion", Sep. 15, 2022, 12 pages.
EP21863013.5, "Extended European Search Report", Aug. 20, 2024, 4 pages.
PCT/US2022/013574, "International Preliminary Report on Patentability", Aug. 8, 2024, 9 pages.

\* cited by examiner

METHODS AND SYSTEMS FOR DRILLING

CROSS-REFERENCES TO RELATED APPLICATIONS

This application is a divisional of U.S. patent application Ser. No. 17/074,282, filed Oct. 19, 2020, which claims priority to and the benefit of U.S. Provisional Application No. 63/069,601, filed Aug. 24, 2020, the entire contents of which is hereby incorporated for all purposes in its entirety.

FIELD OF THE DISCLOSURE

The present disclosure provides systems and methods useful for drilling a well, such as an oil and gas well. The systems and methods can be computer-implemented using processor executable instructions for execution on a processor and can accordingly be executed with a programmed computer system.

DESCRIPTION OF THE RELATED ART

Drilling a borehole for the extraction of minerals has become an increasingly complicated operation due to the increased depth and complexity of many boreholes, including the complexity added by directional drilling. Drilling is an expensive operation and errors in drilling add to the cost and, in some cases, drilling errors may permanently lower the output of a well for years into the future. Conventional technologies and methods may not adequately address the complicated nature of drilling, and may not be capable of gathering and processing various information from downhole sensors and surface control systems in a timely manner, in order to improve drilling operations and minimize drilling errors.

In the oil and gas industry, extraction of hydrocarbon natural resources is done by physically drilling a hole to a reservoir where the hydrocarbon natural resources are trapped. The hydrocarbon natural resources can be up to 10,000 feet or more below the ground surface and be buried under various layers of geological formations. Drilling operations can be conducted by having a rotating drill bit mounted on a bottom hole assembly (BHA) that gives direction to the drill bit for cutting through geological formations and enabled steerable drilling.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE INVENTION

Figure 1:
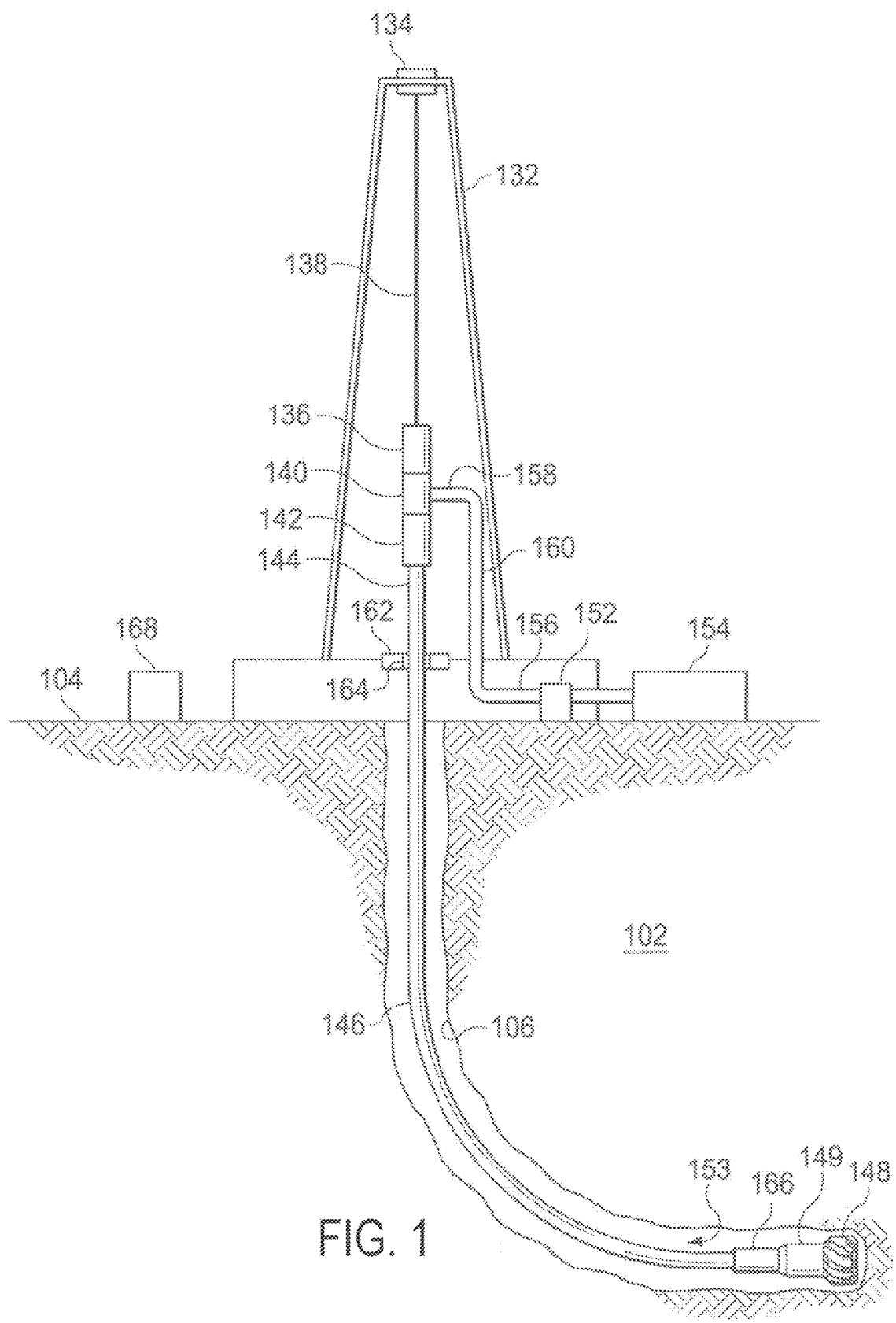
FIG. 1 is a depiction of a drilling system for drilling a borehole.

In the following description, details are set forth by way of example to facilitate discussion of the disclosed subject matter. It is noted, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), device "12-1" refers to an instance of a device class, which may be referred to collectively as devices "12" and any one of which may be referred to generically as a device "12". In the figures and the description, like numerals are intended to represent like elements.

Drilling a well typically involves a substantial amount of human decision-making during the drilling process. For example, geologists and drilling engineers use their knowledge, experience, and the available information to make decisions on how to plan the drilling operation, how to accomplish the drilling plan, and how to handle issues that arise during drilling. However, even the best geologists and drilling engineers perform some guesswork due to the unique nature of each borehole. Furthermore, a directional human driller performing the drilling may have drilled other boreholes in the same region and so may have some similar experience. However, during drilling operations, a multitude of input information and other factors may affect a drilling decision being made by a human operator or specialist, such that the amount of information may overwhelm the cognitive ability of the human to properly consider and factor into the drilling decision. Furthermore, the quality or the error involved with the drilling decision may improve with larger amounts of input data being considered, for example, such as formation data from a large number of offset wells. For these reasons, human specialists may be unable to achieve desirable drilling decisions, particularly when such drilling decisions are made under time constraints, such as during drilling operations when continuation of drilling is dependent on the drilling decision and, thus, the entire drilling rig waits idly for the next drilling decision. Furthermore, human decision-making for drilling decisions can result in expensive mistakes, because drilling errors can add significant cost to drilling operations. In some cases, drilling errors may permanently lower the output of a well, resulting in substantial long term economic losses due to the lost output of the well.

Therefore, the well plan may be updated based on new stratigraphic information from the wellbore, as it is being drilled. This stratigraphic information can be gained on one hand from measurement while drilling (MWD) and logging while drilling (LWD) sensor data, but could also include other reference well data, such as drilling dynamics data or sensor data giving information, for example, on the hardness of the rock in individual strata layers being drilled through.

Referring now to the drawings, Referring to FIG. 1, a drilling system 100 is illustrated in one embodiment as a top drive system. As shown, the drilling system 100 includes a derrick 132 on the surface 104 of the earth and is used to drill a borehole 106 into the earth. Typically, drilling system 100 is used at a location corresponding to a geographic formation 102 in the earth that is known.

In FIG. 1, derrick 132 includes a crown block 134 to which a travelling block 136 is coupled via a drilling line 138. In drilling system 100, a top drive 140 is coupled to travelling block 136 and may provide rotational force for drilling. A saver sub 142 may sit between the top drive 140 and a drill pipe 144 that is part of a drill string 146. Top drive 140 may rotate drill string 146 via the saver sub 142, which in turn may rotate a drill bit 148 of a bottom hole assembly (BHA) 149 in borehole 106 passing through formation 102. Also visible in drilling system 100 is a rotary table 162 that may be fitted with a master bushing 164 to hold drill string 146 when not rotating.

A mud pump 152 may direct a fluid mixture 153 (e.g., a mud mixture) from a mud pit 154 into drill string 146. Mud pit 154 is shown schematically as a container, but it is noted that various receptacles, tanks, pits, or other containers may be used. Mud 153 may flow from mud pump 152 into a discharge line 156 that is coupled to a rotary hose 158 by a standpipe 160. Rotary hose 158 may then be coupled to top drive 140, which includes a passage for mud 153 to flow into borehole 106 via drill string 146 from where mud 153 may emerge at drill bit 148. Mud 153 may lubricate drill bit 148 during drilling and, due to the pressure supplied by mud pump 152, mud 153 may return via borehole 106 to surface 104.

In drilling system 100, drilling equipment (see also FIG. 5) is used to perform the drilling of borehole 106, such as top drive 140 (or rotary drive equipment) that couples to drill string 146 and BHA 149 and is configured to rotate drill string 146 and apply pressure to drill bit 148. Drilling system 100 may include control systems such as a WOB/differential pressure control system 522, a positional/rotary control system 524, a fluid circulation control system 526, and a sensor system 528, as further described below with respect to FIG. 5. The control systems may be used to monitor and change drilling rig settings, such as the WOB or differential pressure to alter the ROP or the radial orientation of the toolface, change the flow rate of drilling mud, and perform other operations. Sensor system 528 may be for obtaining sensor data about the drilling operation and drilling system 100, including the downhole equipment. For example, sensor system 528 may include MWD or logging while drilling (LWD) tools for acquiring information, such as toolface and formation logging information, that may be saved for later retrieval, transmitted with or without a delay using any of various communication means (e.g., wireless, wireline, or mud pulse telemetry), or otherwise transferred to steering control system 168. As used herein, an MWD tool is enabled to communicate downhole measurements without substantial delay to the surface 104, such as using mud pulse telemetry, while a LWD tool is equipped with an internal memory that stores measurements when downhole and can be used to download a stored log of measurements when the LWD tool is at the surface 104. The internal memory in the LWD tool may be a removable memory, such as a universal serial bus (USB) memory device or another removable memory device. It is noted that certain downhole tools may have both MWD and LWD capabilities. Such information acquired by sensor system 528 may include information related to hole depth, bit depth, inclination angle, azimuth angle, true vertical depth, gamma count, standpipe pressure, mud flow rate, rotary rotations per minute (RPM), bit speed, ROP, WOB, among other information. It is noted that all or part of sensor system 528 may be incorporated into a control system, or in another component of the drilling equipment. As drilling system 100 can be configured in many different implementations, it is noted that different control systems and subsystems may be used.

Sensing, detection, measurement, evaluation, storage, alarm, and other functionality may be incorporated into a downhole tool 166 or BHA 149 or elsewhere along drill string 146 to provide downhole surveys of borehole 106. Accordingly, downhole tool 166 may be an MWD tool or a LWD tool or both, and may accordingly utilize connectivity to the surface 104, local storage, or both. In different implementations, gamma radiation sensors, magnetometers, accelerometers, and other types of sensors may be used for the downhole surveys. Although downhole tool 166 is shown in singular in drilling system 100, it is noted that multiple instances (not shown) of downhole tool 166 may be located at one or more locations along drill string 146.

In some embodiments, formation detection and evaluation functionality may be provided via a steering control system 168 on the surface 104. Steering control system 168 may be located in proximity to derrick 132 or may be included with drilling system 100. In other embodiments, steering control system 168 may be remote from the actual location of borehole 106 (see also FIG. 4). For example, steering control system 168 may be a stand-alone system or may be incorporated into other systems included with drilling system 100.

In operation, steering control system 168 may be accessible via a communication network (see also FIG. 10), and may accordingly receive formation information via the communication network. In some embodiments, steering control system 168 may use the evaluation functionality to provide corrective measures, such as a convergence plan to overcome an error in the well trajectory of borehole 106 with respect to a reference, or a planned well trajectory. The convergence plans or other corrective measures may depend on a determination of the well trajectory, and therefore, may be improved in accuracy using surface steering, as disclosed herein.

In particular embodiments, at least a portion of steering control system 168 may be located in downhole tool 166 (not shown). In some embodiments, steering control system 168 may communicate with a separate controller (not shown) located in downhole tool 166. In particular, steering control system 168 may receive and process measurements received from downhole surveys, and may perform the calculations described herein for surface steering using the downhole surveys and other information referenced herein.

In drilling system 100, to aid in the drilling process, data is collected from borehole 106, such as from sensors in BHA 149, downhole tool 166, or both. The collected data may include the geological characteristics of formation 102 in which borehole 106 was formed, the attributes of drilling system 100, including BHA 149, and drilling information such as weight-on-bit (WOB), drilling speed, and other information pertinent to the formation of borehole 106. The drilling information may be associated with a particular depth or another identifiable marker to index collected data. For example, the collected data for borehole 106 may capture drilling information indicating that drilling of the well from 1,000 feet to 1,200 feet occurred at a first rate of penetration (ROP) through a first rock layer with a first WOB, while drilling from 1,200 feet to 1,500 feet occurred at a second ROP through a second rock layer with a second WOB (see also FIG. 2). In some applications, the collected data may be used to virtually recreate the drilling process that created borehole 106 in formation 102, such as by displaying a computer simulation of the drilling process. The accuracy with which the drilling process can be recreated depends on a level of detail and accuracy of the collected data, including collected data from a downhole survey of the well trajectory.

The collected data may be stored in a database that is accessible via a communication network for example. In some embodiments, the database storing the collected data for borehole 106 may be located locally at drilling system 100, at a drilling hub that supports a plurality of drilling systems 100 in a region, or at a database server accessible over the communication network that provides access to the database (see also FIG. 4). At drilling system 100, the collected data may be stored at the surface 104 or downhole in drill string 146, such as in a memory device included with BHA 149 (see also FIG. 10). Alternatively, at least a portion of the collected data may be stored on a removable storage medium, such as using steering control system 168 or BHA 149, that is later coupled to the database in order to transfer the collected data to the database, which may be manually performed at certain intervals, for example.

In FIG. 1, steering control system 168 is located at or near the surface 104 where borehole 106 is being drilled. Steering control system 168 may be coupled to equipment used in drilling system 100 and may also be coupled to the database, whether the database is physically located locally, regionally, or centrally (see also FIGS. 4 and 5). Accordingly, steering control system 168 may collect and record various inputs, such as measurement data from a magnetometer and an accelerometer that may also be included with BHA 149.

Steering control system 168 may further be used as a surface steerable system, along with the database, as described above. The surface steerable system may enable an operator to plan and control drilling operations while drilling is being performed. The surface steerable system may itself also be used to perform certain drilling operations, such as controlling certain control systems that, in turn, control the actual equipment in drilling system 100 (see also FIG. 5). The control of drilling equipment and drilling operations by steering control system 168 may be manual, manual-assisted, semi-automatic, or automatic, in different embodiments.

Manual control may involve direct control of the drilling rig equipment, albeit with certain safety limits to prevent unsafe or undesired actions or collisions of different equipment. To enable manual-assisted control, steering control system 168 may present various information, such as using a graphical user interface (GUI) displayed on a display device (see FIG. 8), to a human operator, and may provide controls that enable the human operator to perform a control operation. The information presented to the user may include live measurements and feedback from the drilling rig and steering control system 168, or the drilling rig itself, and may further include limits and safety-related elements to prevent unwanted actions or equipment states, in response to a manual control command entered by the user using the GUI.

To implement semi-automatic control, steering control system 168 may itself propose or indicate to the user, such as via the GUI, that a certain control operation, or a sequence of control operations, should be performed at a given time. Then, steering control system 168 may enable the user to imitate the indicated control operation or sequence of control operations, such that once manually started, the indicated control operation or sequence of control operations is automatically completed. The limits and safety features mentioned above for manual control would still apply for semi-automatic control. It is noted that steering control system 168 may execute semi-automatic control using a secondary processor, such as an embedded controller that executes under a real-time operating system (RTOS), that is under the control and command of steering control system 168. To implement automatic control, the step of manual starting the indicated control operation or sequence of operations is eliminated, and steering control system 168 may proceed with a passive notification to the user of the actions taken.

In order to implement various control operations, steering control system 168 may perform (or may cause to be performed) various input operations, processing operations, and output operations. The input operations performed by steering control system 168 may result in measurements or other input information being made available for use in any subsequent operations, such as processing or output operations. The input operations may accordingly provide the input information, including feedback from the drilling process itself, to steering control system 168. The processing operations performed by steering control system 168 may be any processing operation associated with surface steering, as disclosed herein. The output operations performed by steering control system 168 may involve generating output information for use by external entities, or for output to a user, such as in the form of updated elements in the GUI, for example. The output information may include at least some of the input information, enabling steering control system 168 to distribute information among various entities and processors.

In particular, the operations performed by steering control system 168 may include operations such as receiving drilling data representing a drill path, receiving other drilling parameters, calculating a drilling solution for the drill path based on the received data and other available data (e.g., rig characteristics), implementing the drilling solution at the drilling rig, monitoring the drilling process to gauge whether the drilling process is within a defined margin of error of the drill path, and calculating corrections for the drilling process if the drilling process is outside of the margin of error.

Accordingly, steering control system 168 may receive input information either before drilling, during drilling, or after drilling of borehole 106. The input information may comprise measurements from one or more sensors, as well as survey information collected while drilling borehole 106. The input information may also include a well plan, a regional formation history, drilling engineer parameters, downhole tool face/inclination information, downhole tool gamma/resistivity information, economic parameters, reliability parameters, among various other parameters. Some of the input information, such as the regional formation history, may be available from a drilling hub 410, which may have respective access to a regional drilling database (DB) 412 (see FIG. 4). Other input information may be accessed or uploaded from other sources to steering control system 168. For example, a web interface may be used to interact directly with steering control system 168 to upload the well plan or drilling parameters.

As noted, the input information may be provided to steering control system 168. After processing by steering control system 168, steering control system 168 may generate control information that may be output to drilling rig 210 (e.g., to rig controls 520 that control drilling equipment 530, see also FIGS. 2 and 5). Drilling rig 210 may provide feedback information using rig controls 520 to steering control system 168. The feedback information may then serve as input information to steering control system 168, thereby enabling steering control system 168 to perform feedback loop control and validation. Accordingly, steering control system 168 may be configured to modify its output information to drilling rig 210, in order to achieve the desired results, which are indicated in the feedback information. The output information generated by steering control system 168 may include indications to modify one or more drilling parameters, the direction of drilling, the drilling mode, among others. In certain operational modes, such as semi-automatic or automatic, steering control system 168 may generate output information indicative of instructions to rig controls 520 to enable automatic drilling using the latest location of BHA 149. Therefore, an improved accuracy in the determination of the location of BHA 149 may be provided using steering control system 168, along with the methods and operations for surface steering disclosed herein.

Figure 2:
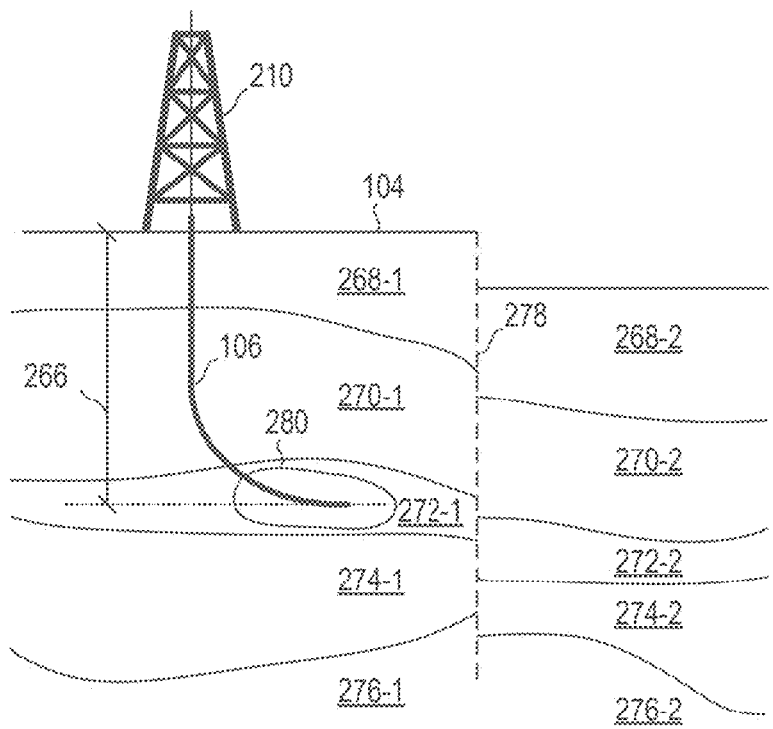
FIG. 2 is a depiction of a drilling environment including the drilling system for drilling a borehole.

Referring now to FIG. 2, a drilling environment 200 is depicted schematically and is not drawn to scale or perspective. In particular, drilling environment 200 may illustrate additional details with respect to formation 102 below the surface 104 in drilling system 100 shown in FIG. 1. In FIG. 2, drilling rig 210 may represent various equipment discussed above with respect to drilling system 100 in FIG. 1 that is located at the surface 104.

In drilling environment 200, it may be assumed that a drilling plan (also referred to as a well plan) has been formulated to drill borehole 106 extending into the ground to a true vertical depth (TVD) 266 and penetrating several subterranean strata layers. Borehole 106 is shown in FIG. 2 extending through strata layers 268-1 and 270-1, while terminating in strata layer 272-1. Accordingly, as shown, borehole 106 does not extend or reach underlying strata layers 274-1 and 276-1. A target area 280 specified in the drilling plan may be located in strata layer 272-1 as shown in FIG. 2. Target area 280 may represent a desired endpoint of borehole 106, such as a hydrocarbon producing area indicated by strata layer 272-1. It is noted that target area 280 may be of any shape and size, and may be defined using various different methods and information in different embodiments. In some instances, target area 280 may be specified in the drilling plan using subsurface coordinates, or references to certain markers, that indicate where borehole 106 is to be terminated. In other instances, target area may be specified in the drilling plan using a depth range within which borehole 106 is to remain. For example, the depth range may correspond to strata layer 272-1. In other examples, target area 280 may extend as far as can be realistically drilled. For example, when borehole 106 is specified to have a horizontal section with a goal to extend into strata layer 172 as far as possible, target area 280 may be defined as strata layer 272-1 itself and drilling may continue until some other physical limit is reached, such as a property boundary or a physical limitation to the length of drill string 146.

Also visible in FIG. 2 is a fault line 278 that has resulted in a subterranean discontinuity in the fault structure. Specifically, strata layers 268, 270, 272, 274, and 276 have portions on either side of fault line 278. On one side of fault line 278, where borehole 106 is located, strata layers 268-1, 270-1, 272-1, 274-1, and 276-1 are unshifted by fault line 278. On the other side of fault line 278, strata layers 268-2, 270-2, 272-2, 274-2, and 276-2 are shifted downwards by fault line 278.

Current drilling operations frequently include directional drilling to reach a target, such as target area 280. The use of directional drilling has been found to generally increase an overall amount of production volume per well, but also may lead to significantly higher production rates per well, which are both economically desirable. As shown in FIG. 2, directional drilling may be used to drill the horizontal portion of borehole 106, which increases an exposed length of borehole 106 within strata layer 272-1, and which may accordingly be beneficial for hydrocarbon extraction from strata layer 272-1. Directional drilling may also be used alter an angle of borehole 106 to accommodate subterranean faults, such as indicated by fault line 278 in FIG. 1. Other benefits that may be achieved using directional drilling include sidetracking off of an existing well to reach a different target area or a missed target area, drilling around abandoned drilling equipment, drilling into otherwise inaccessible or difficult to reach locations (e.g., underpopulated areas or bodies of water), providing a relief well for an existing well, and increasing the capacity of a well by branching off and having multiple boreholes extending in different directions or at different vertical positions for the same well. Directional drilling is often not limited to a straight horizontal borehole 106, but may involve staying within a strata layer that varies in depth and thickness as illustrated by strata layer 272. As such, directional drilling may involve multiple vertical adjustments that complicate the trajectory of borehole 106.

Figure 3:
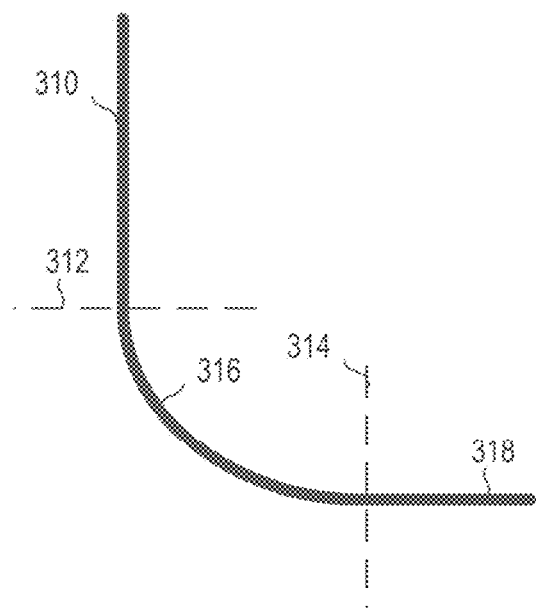
FIG. 3 is a depiction of a borehole generated in the drilling environment.

Referring now to FIG. 3, one embodiment of a portion of borehole 106 is shown in further detail. Using directional drilling for horizontal drilling may introduce certain challenges or difficulties that may not be observed during vertical drilling of borehole 106. For example, a horizontal portion 318 of borehole 106 may be started from a vertical portion 310. In order to make the transition from vertical to horizontal, a curve may be defined that specifies a so-called "build up" section 316. Build up section 316 may begin at a kick off point 312 in vertical portion 310 and may end at a begin point 314 of horizontal portion 318. The change in inclination angle in build up section 316 per measured length drilled is referred to herein as a "build rate" and may be defined in degrees per one hundred feet drilled. For example, the build rate may have a value of 6°/100 ft., indicating that there is a six degree change in inclination angle for every one hundred feet drilled. The build rate for a particular build up section may remain relatively constant or may vary.

The build rate used for any given build up section may depend on various factors, such as properties of the formation (i.e., strata layers) through which borehole 106 is to be drilled, the trajectory of borehole 106, the particular pipe and drill collars/BHA components used (e.g., length, diameter, flexibility, strength, mud motor bend setting, and drill bit), the mud type and flow rate, the specified horizontal displacement, stabilization, and inclination angle, among other factors. An overly aggressive built rate can cause problems such as severe doglegs (e.g., sharp changes in direction in the borehole) that may make it difficult or impossible to run casing or perform other operations in borehole 106. Depending on the severity of any mistakes made during directional drilling, borehole 106 may be enlarged or drill bit 146 may be backed out of a portion of borehole 106 and redrilled along a different path. Such mistakes may be undesirable due to the additional time and expense involved. However, if the built rate is too cautious, additional overall time may be added to the drilling process, because directional drilling generally involves a lower ROP than straight drilling. Furthermore, directional drilling for a curve is more complicated than vertical drilling and the possibility of drilling errors increases with directional drilling (e.g., overshoot and undershoot that may occur while trying to keep drill bit 148 on the planned trajectory).

Two modes of drilling, referred to herein as "rotating" and "sliding", are commonly used to form borehole 106. Rotating, also called "rotary drilling", uses top drive 140 or rotary table 162 to rotate drill string 146. Rotating may be used when drilling occurs along a straight trajectory, such as for vertical portion 310 of borehole 106. Sliding, also called "steering" or "directional drilling" as noted above, typically uses a mud motor located downhole at BHA 149. The mud motor may have an adjustable bent housing and is not powered by rotation of drill string 146. Instead, the mud motor uses hydraulic power derived from the pressurized drilling mud that circulates along borehole 106 to and from the surface 104 to directionally drill borehole 106 in build up section 316.

Thus, sliding is used in order to control the direction of the well trajectory during directional drilling. A method to perform a slide may include the following operations. First, during vertical or straight drilling, the rotation of drill string 146 is stopped. Based on feedback from measuring equipment, such as from downhole tool 166, adjustments may be made to drill string 146, such as using top drive 140 to apply various combinations of torque, WOB, and vibration, among other adjustments. The adjustments may continue until a tool face is confirmed that indicates a direction of the bend of the mud motor is oriented to a direction of a desired deviation (i.e., build rate) of borehole 106. Once the desired orientation of the mud motor is attained, WOB to the drill bit is increased, which causes the drill bit to move in the desired direction of deviation. Once sufficient distance and angle have been built up in the curved trajectory, a transition back to rotating mode can be accomplished by rotating drill string 146 again. The rotation of drill string 146 after sliding may neutralize the directional deviation caused by the bend in the mud motor due to the continuous rotation around a centerline of borehole 106.

Figure 4:
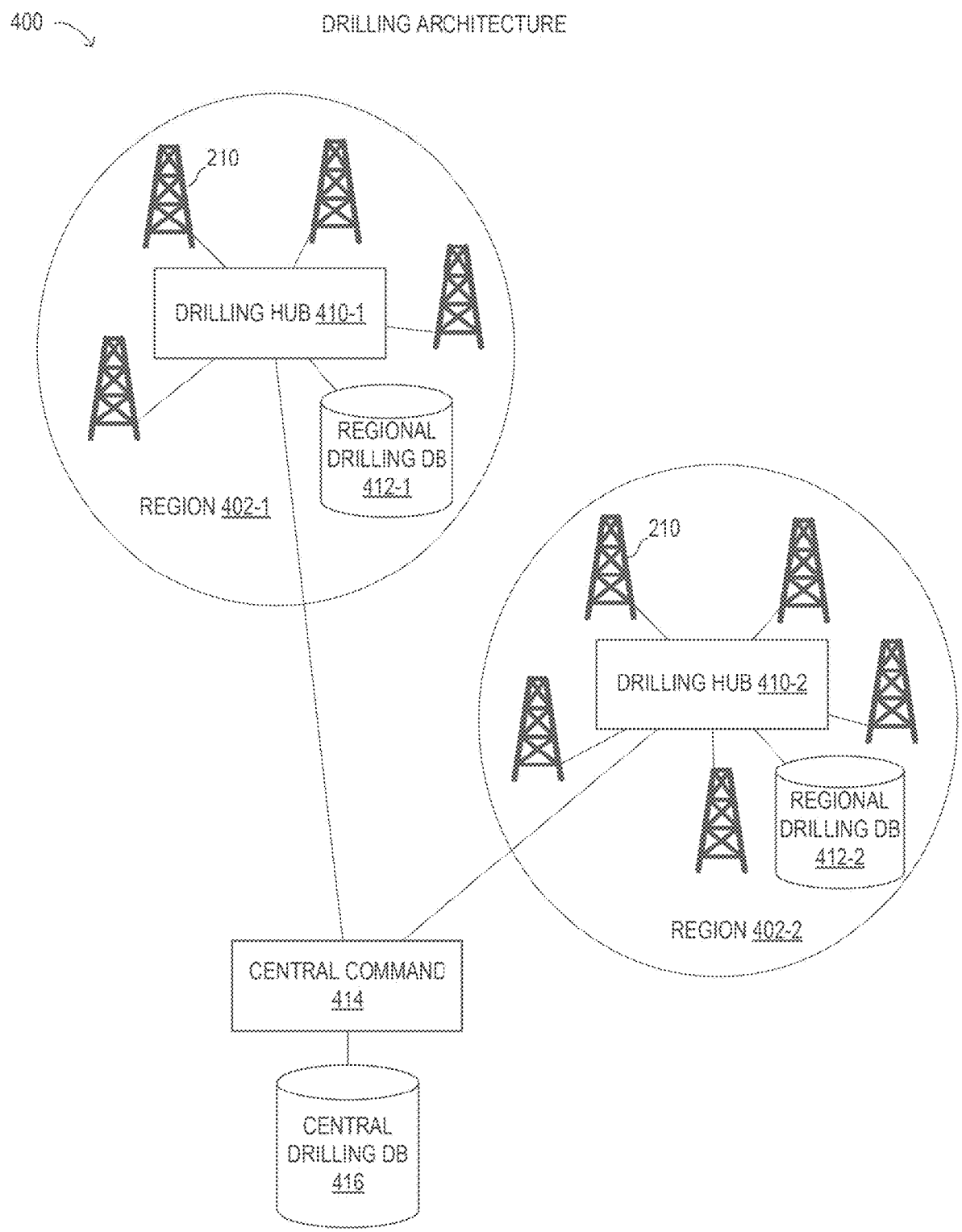
FIG. 4 is a depiction of a drilling architecture including the drilling environment.

Referring now to FIG. 4, a drilling architecture 400 is illustrated in diagram form. As shown, drilling architecture 400 depicts a hierarchical arrangement of drilling hubs 410 and a central command 414, to support the operation of a plurality of drilling rigs 210 in different regions 402. Specifically, as described above with respect to FIGS. 1 and 2, drilling rig 210 includes steering control system 168 that is enabled to perform various drilling control operations locally to drilling rig 210. When steering control system 168 is enabled with network connectivity, certain control operations or processing may be requested or queried by steering control system 168 from a remote processing resource. As shown in FIG. 4, drilling hubs 410 represent a remote processing resource for steering control system 168 located at respective regions 402, while central command 414 may represent a remote processing resource for both drilling hub 410 and steering control system 168.

Specifically, in a region 402-1, a drilling hub 410-1 may serve as a remote processing resource for drilling rigs 210 located in region 402-1, which may vary in number and are not limited to the exemplary schematic illustration of FIG. 4. Additionally, drilling hub 410-1 may have access to a regional drilling DB 412-1, which may be local to drilling hub 410-1. Additionally, in a region 402-2, a drilling hub 410-2 may serve as a remote processing resource for drilling rigs 210 located in region 402-2, which may vary in number and are not limited to the exemplary schematic illustration of FIG. 4. Additionally, drilling hub 410-2 may have access to a regional drilling DB 412-2, which may be local to drilling hub 410-2.

In FIG. 4, respective regions 402 may exhibit the same or similar geological formations. Thus, reference wells, or offset wells, may exist in a vicinity of a given drilling rig 210 in region 402, or where a new well is planned in region 402. Furthermore, multiple drilling rigs 210 may be actively drilling concurrently in region 402, and may be in different stages of drilling through the depths of formation strata layers at region 402. Thus, for any given well being drilled by drilling rig 210 in a region 402, survey data from the reference wells or offset wells may be used to create the well plan, and may be used for surface steering, as disclosed herein. In some implementations, survey data or reference data from a plurality of reference wells may be used to improve drilling performance, such as by reducing an error in estimating TVD or a position of BHA 149 relative to one or more strata layers, as will be described in further detail herein. Additionally, survey data from recently drilled wells, or wells still currently being drilled, including the same well, may be used for reducing an error in estimating TVD or a position of BHA 149 relative to one or more strata layers.

Also shown in FIG. 4 is central command 414, which has access to central drilling DB 416, and may be located at a centralized command center that is in communication with drilling hubs 410 and drilling rigs 210 in various regions 402. The centralized command center may have the ability to monitor drilling and equipment activity at any one or more drilling rigs 210. In some embodiments, central command 414 and drilling hubs 412 may be operated by a commercial operator of drilling rigs 210 as a service to customers who have hired the commercial operator to drill wells and provide other drilling-related services.

In FIG. 4, it is particularly noted that central drilling DB 416 may be a central repository that is accessible to drilling hubs 410 and drilling rigs 210. Accordingly, central drilling DB 416 may store information for various drilling rigs 210 in different regions 402. In some embodiments, central drilling DB 416 may serve as a backup for at least one regional drilling DB 412, or may otherwise redundantly store information that is also stored on at least one regional drilling DB 412. In turn, regional drilling DB 412 may serve as a backup or redundant storage for at least one drilling rig 210 in region 402. For example, regional drilling DB 412 may store information collected by steering control system 168 from drilling rig 210.

In some embodiments, the formulation of a drilling plan for drilling rig 210 may include processing and analyzing the collected data in regional drilling DB 412 to create a more effective drilling plan. Furthermore, once the drilling has begun, the collected data may be used in conjunction with current data from drilling rig 210 to improve drilling decisions. As noted, the functionality of steering control system 168 may be provided at drilling rig 210, or may be provided, at least in part, at a remote processing resource, such as drilling hub 410 or central command 414.

As noted, steering control system 168 may provide functionality as a surface steerable system for controlling drilling rig 210. Steering control system 168 may have access to regional drilling DB 412 and central drilling DB 416 to provide the surface steerable system functionality. As will be described in greater detail below, steering control system 168 may be used to plan and control drilling operations based on input information, including feedback from the drilling process itself. Steering control system 168 may be used to perform operations such as receiving drilling data representing a drill trajectory and other drilling parameters, calculating a drilling solution for the drill trajectory based on the received data and other available data (e.g., rig characteristics), implementing the drilling solution at drilling rig 210, monitoring the drilling process to gauge whether the drilling process is within a margin of error that is defined for the drill trajectory, or calculating corrections for the drilling process if the drilling process is outside of the margin of error.

Figure 5:
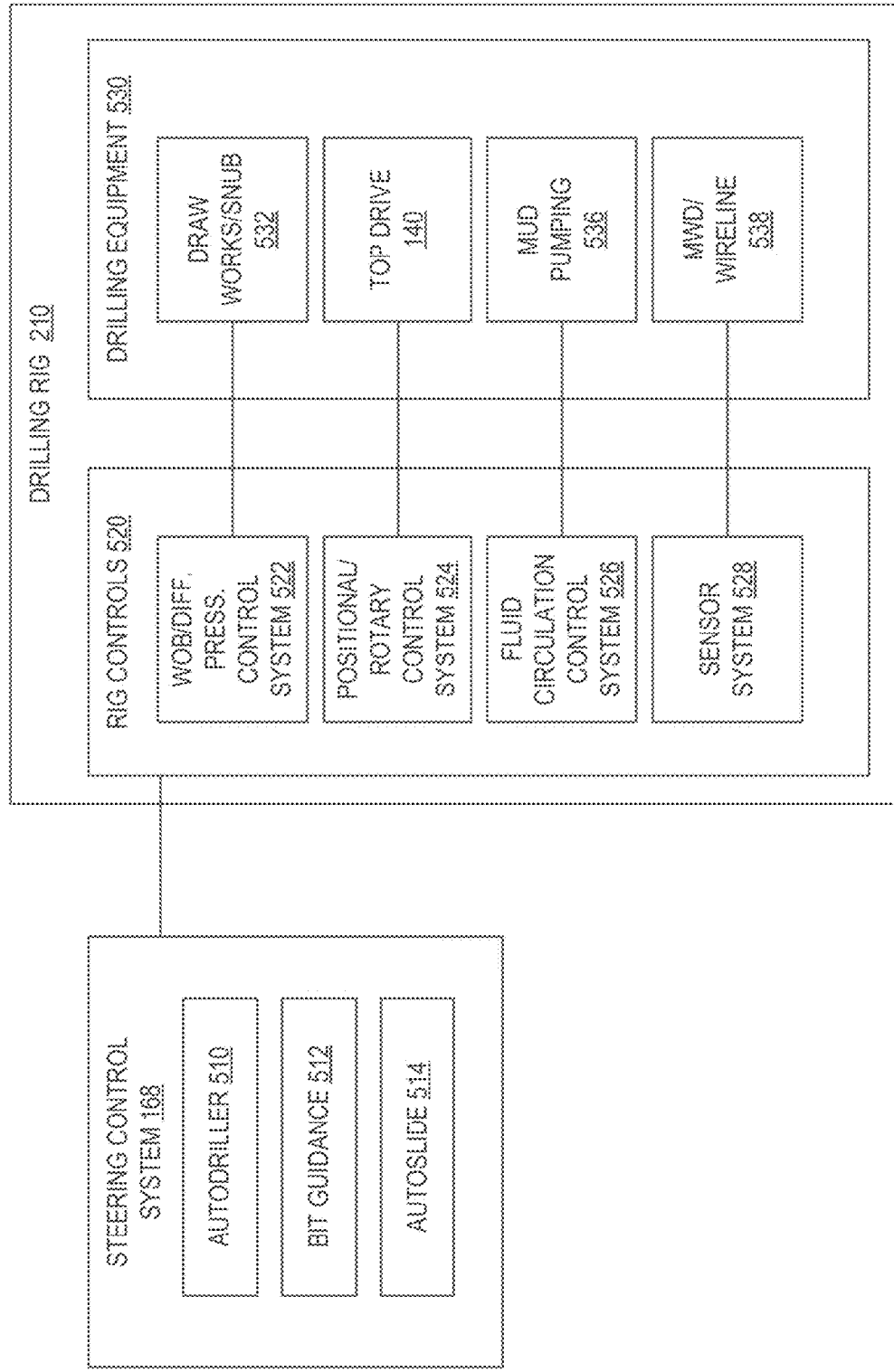
FIG. 5 is a depiction of rig control systems included in the drilling system.

Referring now to FIG. 5, an example of rig control systems 500 is illustrated in schematic form. It is noted that rig control systems 500 may include fewer or more elements than shown in FIG. 5 in different embodiments. As shown, rig control systems 500 includes steering control system 168 and drilling rig 210. Specifically, steering control system 168 is shown with logical functionality including an autodriller 510, a bit guidance 512, and an autoslide 514. Drilling rig 210 is hierarchically shown including rig controls 520, which provide secure control logic and processing capability, along with drilling equipment 530, which represents the physical equipment used for drilling at drilling rig 210. As shown, rig controls 520 include WOB/differential pressure control system 522, positional/rotary control system 524, fluid circulation control system 526, and sensor system 528, while drilling equipment 530 includes a draw works/snub 532, top drive 140, a mud pumping 536, and an MWD/wireline 538.

Figure 10:
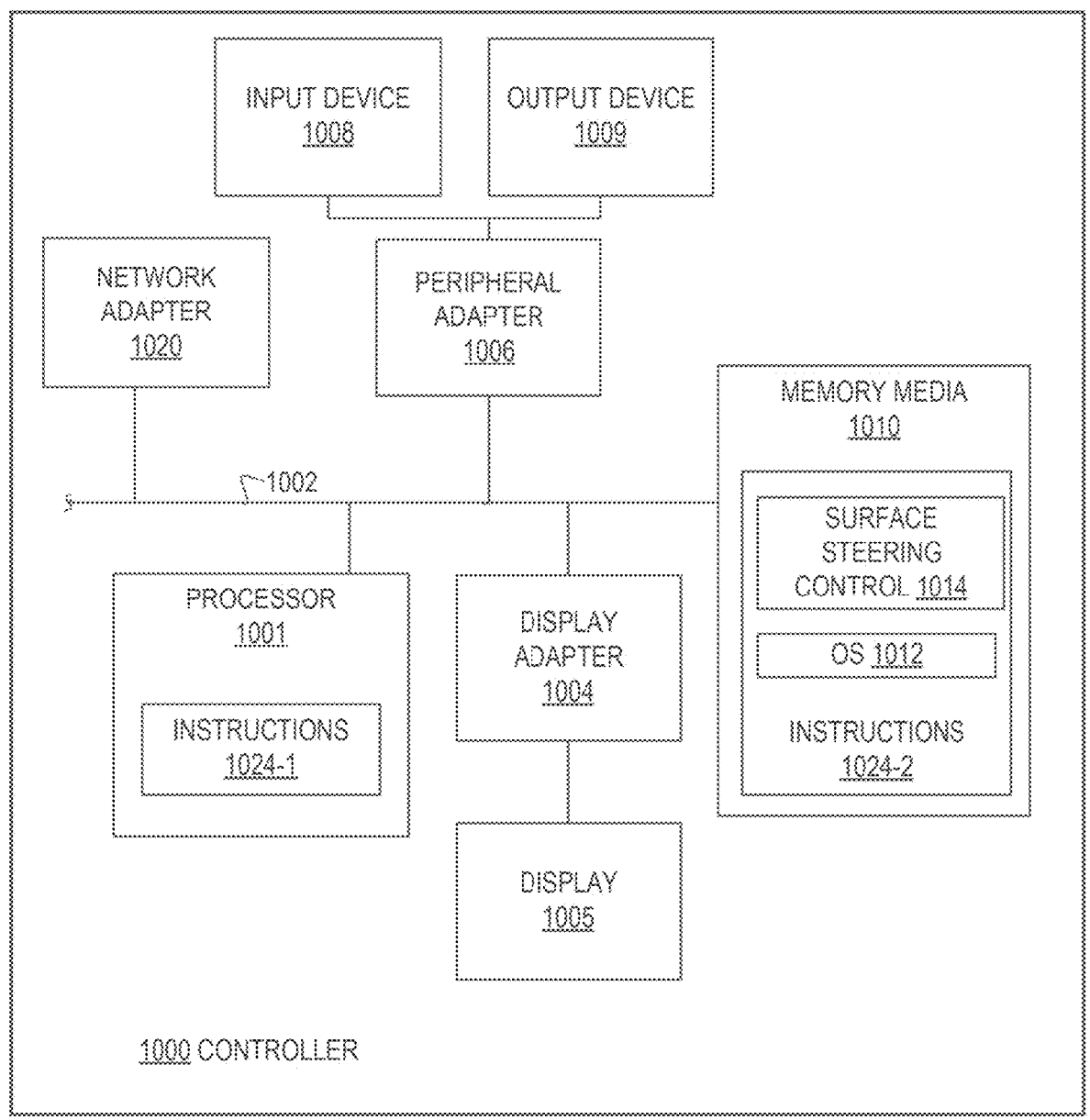
FIG. 10 is a depiction of a controller usable by the rig control systems.

Steering control system 168 represent an instance of a processor having an accessible memory storing instructions executable by the processor, such as an instance of controller 1000 shown in FIG. 10. Also, WOB/differential pressure control system 522, positional/rotary control system 524, and fluid circulation control system 526 may each represent an instance of a processor having an accessible memory storing instructions executable by the processor, such as an instance of controller 1000 shown in FIG. 10, but for example, in a configuration as a programmable logic controller (PLC) that may not include a user interface but may be used as an embedded controller. Accordingly, it is noted that each of the systems included in rig controls 520 may be a separate controller, such as a PLC, and may autonomously operate, at least to a degree. Steering control system 168 may represent hardware that executes instructions to implement a surface steerable system that provides feedback and automation capability to an operator, such as a driller. For example, steering control system 168 may cause autodriller 510, bit guidance 512 (also referred to as a bit guidance system (BGS)), and autoslide 514 (among others, not shown) to be activated and executed at an appropriate time during drilling. In particular implementations, steering control system 168 may be enabled to provide a user interface during drilling, such as the user interface 850 depicted and described below with respect to FIG. 8. Accordingly, steering control system 168 may interface with rig controls 520 to facilitate manual, assisted manual, semi-automatic, and automatic operation of drilling equipment 530 included in drilling rig 210. It is noted that rig controls 520 may also accordingly be enabled for manual or user-controlled operation of drilling, and may include certain levels of automation with respect to drilling equipment 530.

In rig control systems 500 of FIG. 5, WOB/differential pressure control system 522 may be interfaced with draw works/snubbing unit 532 to control WOB of drill string 146. Positional/rotary control system 524 may be interfaced with top drive 140 to control rotation of drill string 146. Fluid circulation control system 526 may be interfaced with mud pumping 536 to control mud flow and may also receive and decode mud telemetry signals. Sensor system 528 may be interfaced with MWD/wireline 538, which may represent various BHA sensors and instrumentation equipment, among other sensors that may be downhole or at the surface.

In rig control systems 500, autodriller 510 may represent an automated rotary drilling system and may be used for controlling rotary drilling. Accordingly, autodriller 510 may enable automate operation of rig controls 520 during rotary drilling, as indicated in the well plan. Bit guidance 512 may represent an automated control system to monitor and control performance and operation drilling bit 148.

In rig control systems 500, autoslide 514 may represent an automated slide drilling system and may be used for controlling slide drilling. Accordingly, autoslide 514 may enable automate operation of rig controls 520 during a slide, and may return control to steering control system 168 for rotary drilling at an appropriate time, as indicated in the well plan. In particular implementations, autoslide 514 may be enabled to provide a user interface during slide drilling to specifically monitor and control the slide. For example, autoslide 514 may rely on bit guidance 512 for orienting a tool face and on autodriller 510 to set WOB or control rotation or vibration of drill string 146.

Figures 6, 7:
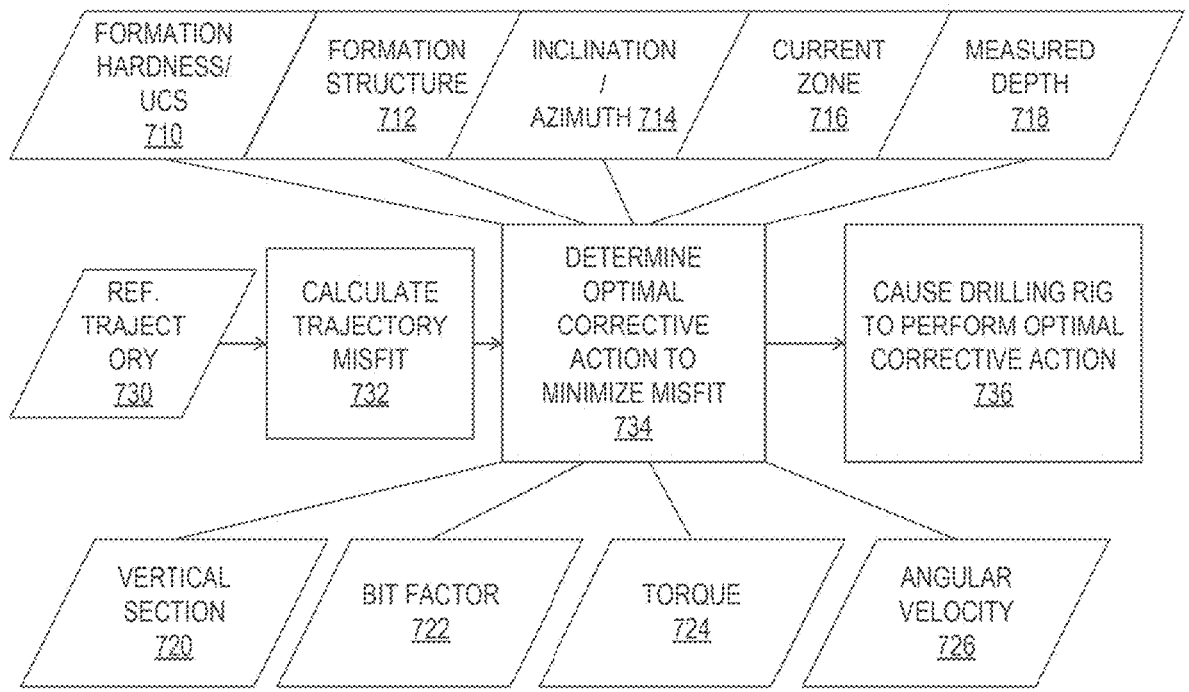
FIG. 6 is a depiction of algorithm modules used by the rig control systems.
FIG. 7 is a depiction of a steering control process used by the rig control systems.

FIG. 6 illustrates one embodiment of control algorithm modules 600 used with steering control system 168. The control algorithm modules 600 of FIG. 6 include: a slide control executor 650 that is responsible for managing the execution of the slide control algorithms; a slide control configuration provider 652 that is responsible for validating, maintaining, and providing configuration parameters for the other software modules; a BHA & pipe specification provider 654 that is responsible for managing and providing details of BHA 149 and drill string 146 characteristics; a borehole geometry model 656 that is responsible for keeping track of the borehole geometry and providing a representation to other software modules; a top drive orientation impact model 658 that is responsible for modeling the impact that changes to the angular orientation of top drive 140 have had on the tool face control; a top drive oscillator impact model 660 that is responsible for modeling the impact that oscillations of top drive 140 has had on the tool face control; an ROP impact model 662 that is responsible for modeling the effect on the tool face control of a change in ROP or a corresponding ROP set point; a WOB impact model 664 that is responsible for modeling the effect on the tool face control of a change in WOB or a corresponding WOB set point; a differential pressure impact model 666 that is responsible for modeling the effect on the tool face control of a change in differential pressure (DP) or a corresponding DP set point; a torque model 668 that is responsible for modeling the comprehensive representation of torque for surface, downhole, break over, and reactive torque, modeling impact of those torque values on tool face control, and determining torque operational thresholds; a tool face control evaluator 672 that is responsible for evaluating factors impacting tool face control and whether adjustments need to be projected, determining whether re-alignment off-bottom is indicated, and determining off-bottom tool face operational threshold windows; a tool face projection 670 that is responsible for projecting tool face behavior for top drive 140, the top drive oscillator, and auto driller adjustments; a top drive adjustment calculator 674 that is responsible for calculating top drive adjustments resultant to tool face projections; an oscillator adjustment calculator 676 that is responsible for calculating oscillator adjustments resultant to tool face projections; and an autodriller adjustment calculator 678 that is responsible for calculating adjustments to autodriller 510 resultant to tool face projections.

FIG. 7 illustrates one embodiment of a steering control process 700 for determining a corrective action for drilling. Steering control process 700 may be used for rotary drilling or slide drilling in different embodiments.

Steering control process 700 in FIG. 7 illustrates a variety of inputs that can be used to determine an optimum corrective action. As shown in FIG. 7, the inputs include formation hardness/unconfined compressive strength (UCS) 710, formation structure 712, inclination/azimuth 714, current zone 716, measured depth 718, desired tool face 730, vertical section 720, bit factor 722, mud motor torque 724, reference trajectory 730, vertical section 720, bit factor 722, torque 724 and angular velocity 726. In FIG. 7, reference trajectory 730 of borehole 106 is determined to calculate a trajectory misfit in a step 732. Step 732 may output the trajectory misfit to determine a corrective action to minimize the misfit at step 734, which may be performed using the other inputs described above. Then, at step 736, the drilling rig is caused to perform the corrective action.

It is noted that in some implementations, at least certain portions of steering control process 700 may be automated or performed without user intervention, such as using rig control systems 700 (see FIG. 7). In other implementations, the corrective action in step 736 may be provided or communicated (by display, SMS message, email, or otherwise) to one or more human operators, who may then take appropriate action. The human operators may be members of a rig crew, which may be located at or near drilling rig 210, or may be located remotely from drilling rig 210.

Figure 8:
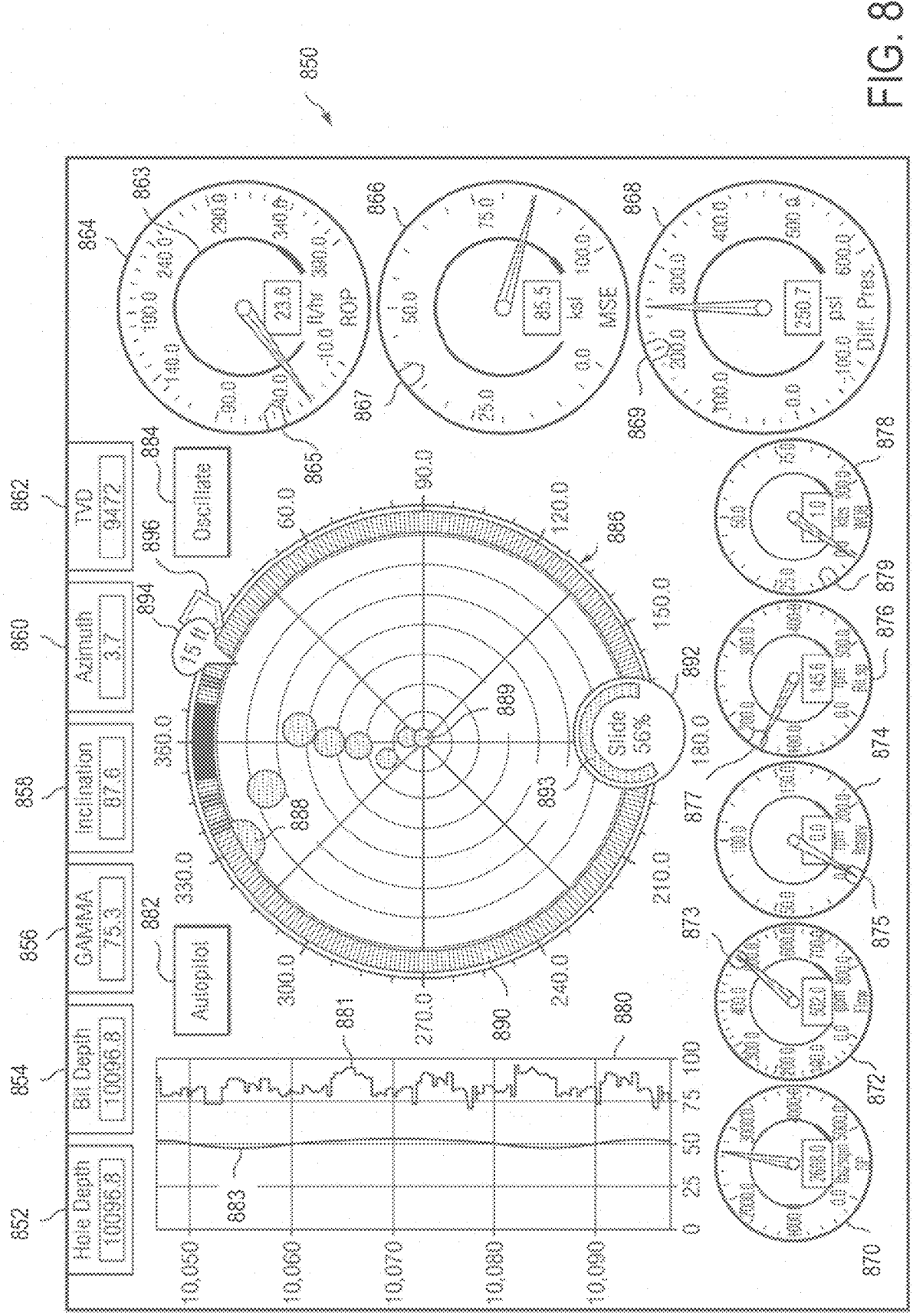
FIG. 8 is a depiction of a graphical user interface provided by the rig control systems.

Referring to FIG. 8, one embodiment of a user interface 850 that may be generated by steering control system 168 for monitoring and operation by a human operator is illustrated. User interface 850 may provide many different types of information in an easily accessible format. For example, user interface 850 may be shown on a computer monitor, a television, a viewing screen (e.g., a display device) associated with steering control system 168.

As shown in FIG. 8, user interface 850 provides visual indicators such as a hole depth indicator 852, a bit depth indicator 854, a GAMMA indicator 856, an inclination indicator 858, an azimuth indicator 860, and a TVD indicator 862. Other indicators may also be provided, including a ROP indicator 864, a mechanical specific energy (MSE) indicator 866, a differential pressure indicator 868, a standpipe pressure indicator 870, a flow rate indicator 872, a rotary RPM (angular velocity) indicator 874, a bit speed indicator 876, and a WOB indicator 878.

In FIG. 8, at least some of indicators 864, 866, 868, 870, 872, 874, 876, and 878 may include a marker representing a target value. For example, markers may be set as certain given values, but it is noted that any desired target value may be used. Although not shown, in some embodiments, multiple markers may be present on a single indicator. The markers may vary in color or size. For example, ROP indicator 864 may include a marker 865 indicating that the target value is 50 feet/hour (or 15 m/h). MSE indicator 866 may include a marker 867 indicating that the target value is 37 ksi (or 255 MPa). Differential pressure indicator 868 may include a marker 869 indicating that the target value is 200 psi (or 1.38 kPa). ROP indicator 864 may include a marker 865 indicating that the target value is 50 feet/hour (or 15 m/h). Standpipe pressure indicator 870 may have no marker in the present example. Flow rate indicator 872 may include a marker 873 indicating that the target value is 500 gpm (or 31.5 L/s). Rotary RPM indicator 874 may include a marker 875 indicating that the target value is 0 RPM (e.g., due to sliding). Bit speed indicator 876 may include a marker 877 indicating that the target value is 150 RPM. WOB indicator 878 may include a marker 879 indicating that the target value is 10 klbs (or 4,500 kg). Each indicator may also include a colored band, or another marking, to indicate, for example, whether the respective gauge value is within a safe range (e.g., indicated by a green color), within a caution range (e.g., indicated by a yellow color), or within a danger range (e.g., indicated by a red color).

In FIG. 8, a log chart 880 may visually indicate depth versus one or more measurements (e.g., may represent log inputs relative to a progressing depth chart). For example, log chart 880 may have a Y-axis representing depth and an X-axis representing a measurement such as GAMMA count 881 (as shown), ROP 883 (e.g., empirical ROP and normalized ROP), or resistivity. An autopilot button 882 and an oscillate button 884 may be used to control activity. For example, autopilot button 882 may be used to engage or disengage autodriller 510, while oscillate button 884 may be used to directly control oscillation of drill string 146 or to engage/disengage an external hardware device or controller.

In FIG. 8, a circular chart 886 may provide current and historical tool face orientation information (e.g., which way the bend is pointed). For purposes of illustration, circular chart 886 represents three hundred and sixty degrees. A series of circles within circular chart 886 may represent a timeline of tool face orientations, with the sizes of the circles indicating the temporal position of each circle. For example, larger circles may be more recent than smaller circles, so a largest circle 888 may be the newest reading and a smallest circle 889 may be the oldest reading. In other embodiments, circles 889, 888 may represent the energy or progress made via size, color, shape, a number within a circle, etc. For example, a size of a particular circle may represent an accumulation of orientation and progress for the period of time represented by the circle. In other embodiments, concentric circles representing time (e.g., with the outside of circular chart 886 being the most recent time and the center point being the oldest time) may be used to indicate the energy or progress (e.g., via color or patterning such as dashes or dots rather than a solid line).

In user interface 850, circular chart 886 may also be color coded, with the color coding existing in a band 890 around circular chart 886 or positioned or represented in other ways. The color coding may use colors to indicate activity in a certain direction. For example, the color red may indicate the highest level of activity, while the color blue may indicate the lowest level of activity. Furthermore, the arc range in degrees of a color may indicate the amount of deviation. Accordingly, a relatively narrow (e.g., thirty degrees) arc of red with a relatively broad (e.g., three hundred degrees) arc of blue may indicate that most activity is occurring in a particular tool face orientation with little deviation. As shown in user interface 850, the color blue may extend from approximately 22-337 degrees, the color green may extend from approximately 15-22 degrees and 337-345 degrees, the color yellow may extend a few degrees around the 13 and 345 degree marks, while the color red may extend from approximately 347-10 degrees. Transition colors or shades may be used with, for example, the color orange marking the transition between red and yellow or a light blue marking the transition between blue and green. This color coding may enable user interface 850 to provide an intuitive summary of how narrow the standard deviation is and how much of the energy intensity is being expended in the proper direction. Furthermore, the center of energy may be viewed relative to the target. For example, user interface 850 may clearly show that the target is at 90 degrees but the center of energy is at 45 degrees.

In user interface 850, other indicators, such as a slide indicator 892, may indicate how much time remains until a slide occurs or how much time remains for a current slide. For example, slide indicator 892 may represent a time, a percentage (e.g., as shown, a current slide may be 56% complete), a distance completed, or a distance remaining. Slide indicator 892 may graphically display information using, for example, a colored bar 893 that increases or decreases with slide progress. In some embodiments, slide indicator 892 may be built into circular chart 886 (e.g., around the outer edge with an increasing/decreasing band), while in other embodiments slide indicator 892 may be a separate indicator such as a meter, a bar, a gauge, or another indicator type. In various implementations, slide indicator 892 may be refreshed by autoslide 514.

In user interface 850, an error indicator 894 may indicate a magnitude and a direction of error. For example, error indicator 894 may indicate that an estimated drill bit position is a certain distance from the planned trajectory, with a location of error indicator 894 around the circular chart 886 representing the heading. For example, FIG. 8 illustrates an error magnitude of 15 feet and an error direction of 15 degrees. Error indicator 894 may be any color but may be red for purposes of example. It is noted that error indicator 894 may present a zero if there is no error. Error indicator may represent that drill bit 148 is on the planned trajectory using other means, such as being a green color. Transition colors, such as yellow, may be used to indicate varying amounts of error. In some embodiments, error indicator 894 may not appear unless there is an error in magnitude or direction. A marker 896 may indicate an ideal slide direction. Although not shown, other indicators may be present, such as a bit life indicator to indicate an estimated lifetime for the current bit based on a value such as time or distance.

It is noted that user interface 850 may be arranged in many different ways. For example, colors may be used to indicate normal operation, warnings, and problems. In such cases, the numerical indicators may display numbers in one color (e.g., green) for normal operation, may use another color (e.g., yellow) for warnings, and may use yet another color (e.g., red) when a serious problem occurs. The indicators may also flash or otherwise indicate an alert. The gauge indicators may include colors (e.g., green, yellow, and red) to indicate operational conditions and may also indicate the target value (e.g., an ROP of 100 feet/hour). For example, ROP indicator 868 may have a green bar to indicate a normal level of operation (e.g., from 10-300 feet/hour), a yellow bar to indicate a warning level of operation (e.g., from 300-360 feet/hour), and a red bar to indicate a dangerous or otherwise out of parameter level of operation (e.g., from 360-390 feet/hour). ROP indicator 868 may also display a marker at 100 feet/hour to indicate the desired target ROP.

Furthermore, the use of numeric indicators, gauges, and similar visual display indicators may be varied based on factors such as the information to be conveyed and the personal preference of the viewer. Accordingly, user interface 850 may provide a customizable view of various drilling processes and information for a particular individual involved in the drilling process. For example, steering control system 168 may enable a user to customize the user interface 850 as desired, although certain features (e.g., standpipe pressure) may be locked to prevent a user from intentionally or accidentally removing important drilling information from user interface 850. Other features and attributes of user interface 850 may be set by user preference. Accordingly, the level of customization and the information shown by the user interface 850 may be controlled based on who is viewing user interface 850 and their role in the drilling process.

Figure 9:
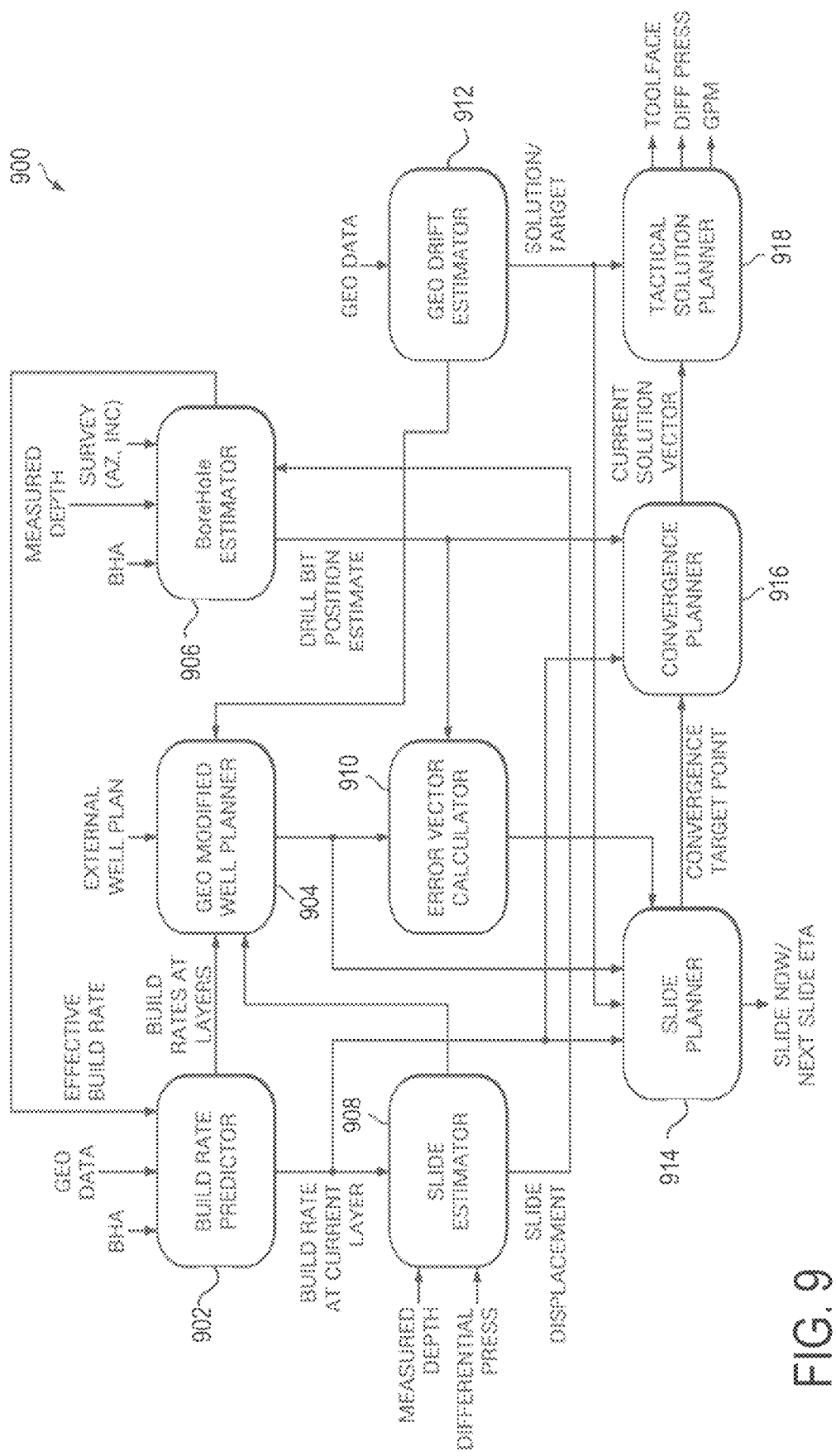
FIG. 9 is a depiction of a guidance control loop performed by the rig control systems.

Referring to FIG. 9, one embodiment of a guidance control loop (GCL) 900 is shown in further detail GCL 900 may represent one example of a control loop or control algorithm executed under the control of steering control system 168. GCL 900 may include various functional modules, including a build rate predictor 902, a geo modified well planner 904, a borehole estimator 906, a slide estimator 908, an error vector calculator 910, a geological drift estimator 912, a slide planner 914, a convergence planner 916, and a tactical solution planner 918. In the following description of GCL 900, the term "external input" refers to input received from outside GCL 900, while "internal input" refers to input exchanged between functional modules of GCL 900.

In FIG. 9, build rate predictor 902 receives external input representing BHA information and geological information, receives internal input from the borehole estimator 906, and provides output to geo modified well planner 904, slide estimator 908, slide planner 914, and convergence planner 916. Build rate predictor 902 is configured to use the BHA information and geological information to predict drilling build rates of current and future sections of borehole 106. For example, build rate predictor 902 may determine how aggressively a curve will be built for a given formation with BHA 149 and other equipment parameters.

In FIG. 9, build rate predictor 902 may use the orientation of BHA 149 to the formation to determine an angle of attack for formation transitions and build rates within a single layer of a formation. For example, if a strata layer of rock is below a strata layer of sand, a formation transition exists between the strata layer of sand and the strata layer of rock. Approaching the strata layer of rock at a 90 degree angle may provide a good tool face and a clean drill entry, while approaching the rock layer at a 45 degree angle may build a curve relatively quickly. An angle of approach that is near parallel may cause drill bit 148 to skip off the upper surface of the strata layer of rock. Accordingly, build rate predictor 902 may calculate BHA orientation to account for formation transitions. Within a single strata layer, build rate predictor 902 may use the BHA orientation to account for internal layer characteristics (e.g., grain) to determine build rates for different parts of a strata layer. The BHA information may include bit characteristics, mud motor bend setting, stabilization and mud motor bit to bend distance. The geological information may include formation data such as compressive strength, thicknesses, and depths for formations encountered in the specific drilling location. Such information may enable a calculation-based prediction of the build rates and ROP that may be compared to both results obtained while drilling borehole 106 and regional historical results (e.g., from the regional drilling DB 412) to improve the accuracy of predictions as drilling progresses. Build rate predictor 902 may also be used to plan convergence adjustments and confirm in advance of drilling that targets can be achieved with current parameters.

In FIG. 9, geo modified well planner 904 receives external input representing a well plan, internal input from build rate predictor 902 and geo drift estimator 912, and provides output to slide planner 914 and error vector calculator 910. Geo modified well planner 904 uses the input to determine whether there is a more desirable trajectory than that provided by the well plan, while staying within specified error limits. More specifically, geo modified well planner 904 takes geological information (e.g., drift) and calculates whether another trajectory solution to the target may be more efficient in terms of cost or reliability. The outputs of geo modified well planner 904 to slide planner 914 and error vector calculator 910 may be used to calculate an error vector based on the current vector to the newly calculated trajectory and to modify slide predictions. In some embodiments, geo modified well planner 904 (or another module) may provide functionality needed to track a formation trend. For example, in horizontal wells, a geologist may provide steering control system 168 with a target inclination angle as a set point for steering control system 168 to control. For example, the geologist may enter a target to steering control system 168 of 90.5-91.0 degrees of inclination angle for a section of borehole 106. Geo modified well planner 904 may then treat the target as a vector target, while remaining within the error limits of the original well plan. In some embodiments, geo modified well planner 904 may be an optional module that is not used unless the well plan is to be modified. For example, if the well plan is marked in steering control system 168 as non-modifiable, geo modified well planner 904 may be bypassed altogether or geo modified well planner 904 may be configured to pass the well plan through without any changes.

In FIG. 9, borehole estimator 906 may receive external inputs representing BHA information, measured depth information, survey information (e.g., azimuth angle and inclination angle), and may provide outputs to build rate predictor 902, error vector calculator 910, and convergence planner 916. Borehole estimator 906 may be configured to provide an estimate of the actual borehole and drill bit position and trajectory angle without delay, based on either straight line projections or projections that incorporate sliding. Borehole estimator 906 may be used to compensate for a sensor being physically located some distance behind drill bit 148 (e.g., 50 feet) in drill string 146, which makes sensor readings lag the actual bit location by 50 feet. Borehole estimator 906 may also be used to compensate for sensor measurements that may not be continuous (e.g., a sensor measurement may occur every 100 feet). Borehole estimator 906 may provide the most accurate estimate from the surface to the last survey location based on the collection of survey measurements. Also, borehole estimator 906 may take the slide estimate from slide estimator 908 (described below) and extend the slide estimate from the last survey point to a current location of drill bit 148. Using the combination of these two estimates, borehole estimator 906 may provide steering control system 168 with an estimate of the drill bit's location and trajectory angle from which guidance and steering solutions can be derived. An additional metric that can be derived from the borehole estimate is the effective build rate that is achieved throughout the drilling process.

In FIG. 9, slide estimator 908 receives external inputs representing measured depth and differential pressure information, receives internal input from build rate predictor 902, and provides output to borehole estimator 906 and geo modified well planner 904. Slide estimator 908 may be configured to sample tool face orientation, differential pressure, measured depth (MD) incremental movement, MSE, and other sensor feedback to quantify/estimate a deviation vector and progress while sliding.

Traditionally, deviation from the slide would be predicted by a human operator based on experience. The operator would, for example, use a long slide cycle to assess what likely was accomplished during the last slide. However, the results are generally not confirmed until the downhole survey sensor point passes the slide portion of the borehole, often resulting in a response lag defined by a distance of the sensor point from the drill bit tip (e.g., approximately 50 feet).

Such a response lag may introduce inefficiencies in the slide cycles due to over/under correction of the actual trajectory relative to the planned trajectory.

In GCL 900, using slide estimator 908, each tool face update may be algorithmically merged with the average differential pressure of the period between the previous and current tool face readings, as well as the MD change during this period to predict the direction, angular deviation, and MD progress during the period. As an example, the periodic rate may be between 10 and 60 seconds per cycle depending on the tool face update rate of downhole tool 166. With a more accurate estimation of the slide effectiveness, the sliding efficiency can be improved. The output of slide estimator 908 may accordingly be periodically provided to borehole estimator 906 for accumulation of well deviation information, as well to geo modified well planner 904. Some or all of the output of the slide estimator 908 may be output to an operator, such as shown in the user interface 850 of FIG. 8.

In FIG. 9, error vector calculator 910 may receive internal input from geo modified well planner 904 and borehole estimator 906. Error vector calculator 910 may be configured to compare the planned well trajectory to an actual borehole trajectory and drill bit position estimate. Error vector calculator 910 may provide the metrics used to determine the error (e.g., how far off) the current drill bit position and trajectory are from the well plan. For example, error vector calculator 910 may calculate the error between the current bit position and trajectory to the planned trajectory and the desired bit position. Error vector calculator 910 may also calculate a projected bit position/projected trajectory representing the future result of a current error.

In FIG. 9, geological drift estimator 912 receives external input representing geological information and provides outputs to geo modified well planner 904, slide planner 914, and tactical solution planner 918. During drilling, drift may occur as the particular characteristics of the formation affect the drilling direction. More specifically, there may be a trajectory bias that is contributed by the formation as a function of ROP and BHA 149. Geological drift estimator 912 is configured to provide a drift estimate as a vector that can then be used to calculate drift compensation parameters that can be used to offset the drift in a control solution.

In FIG. 9, slide planner 914 receives internal input from build rate predictor 902, geo modified well planner 904, error vector calculator 910, and geological drift estimator 912, and provides output to convergence planner 916 as well as an estimated time to the next slide. Slide planner 914 may be configured to evaluate a slide/drill ahead cost calculation and plan for sliding activity, which may include factoring in BHA wear, expected build rates of current and expected formations, and the well plan trajectory. During drill ahead, slide planner 914 may attempt to forecast an estimated time of the next slide to aid with planning. For example, if additional lubricants (e.g., fluorinated beads) are indicated for the next slide, and pumping the lubricants into drill string 146 has a lead time of 30 minutes before the slide, the estimated time of the next slide may be calculated and then used to schedule when to start pumping the lubricants. Functionality for a loss circulation material (LCM) planner may be provided as part of slide planner 914 or elsewhere (e.g., as a stand-alone module or as part of another module described herein). The LCM planner functionality may be configured to determine whether additives should be pumped into the borehole based on indications such as flow-in versus flow-back measurements. For example, if drilling through a porous rock formation, fluid being pumped into the borehole may get lost in the rock formation. To address this issue, the LCM planner may control pumping LCM into the borehole to clog up the holes in the porous rock surrounding the borehole to establish a more closed-loop control system for the fluid.

In FIG. 9, slide planner 914 may also look at the current position relative to the next connection. A connection may happen every 90 to 100 feet (or some other distance or distance range based on the particulars of the drilling operation) and slide planner 914 may avoid planning a slide when close to a connection or when the slide would carry through the connection. For example, if the slide planner 914 is planning a 50 foot slide but only 20 feet remain until the next connection, slide planner 914 may calculate the slide starting after the next connection and make any changes to the slide parameters to accommodate waiting to slide until after the next connection. Such flexible implementation avoids inefficiencies that may be caused by starting the slide, stopping for the connection, and then having to reorient the tool face before finishing the slide. During slides, slide planner 914 may provide some feedback as to the progress of achieving the desired goal of the current slide. In some embodiments, slide planner 914 may account for reactive torque in drill string 146. More specifically, when rotating is occurring, there is a reactional torque wind up in drill string 146. When the rotating is stopped, drill string 146 unwinds, which changes tool face orientation and other parameters. When rotating is started again, drill string 146 starts to wind back up. Slide planner 914 may account for the reactional torque so that tool face references are maintained, rather than stopping rotation and then trying to adjust to a desired tool face orientation. While not all downhole tools may provide tool face orientation when rotating, using one that does supply such information for GCL 900 may significantly reduce the transition time from rotating to sliding.

In FIG. 9, convergence planner 916 receives internal inputs from build rate predictor 902, borehole estimator 906, and slide planner 914, and provides output to tactical solution planner 918. Convergence planner 916 is configured to provide a convergence plan when the current drill bit position is not within a defined margin of error of the planned well trajectory. The convergence plan represents a path from the current drill bit position to an achievable and desired convergence target point along the planned trajectory. The convergence plan may take account the amount of sliding/drilling ahead that has been planned to take place by slide planner 914. Convergence planner 916 may also use BHA orientation information for angle of attack calculations when determining convergence plans as described above with respect to build rate predictor 902. The solution provided by convergence planner 916 defines a new trajectory solution for the current position of drill bit 148. The solution may be immediate without delay, or planned for implementation at a future time that is specified in advance.

In FIG. 9, tactical solution planner 918 receives internal inputs from geological drift estimator 912 and convergence planner 916, and provides external outputs representing information such as tool face orientation, differential pressure, and mud flow rate. Tactical solution planner 918 is configured to take the trajectory solution provided by convergence planner 916 and translate the solution into control parameters that can be used to control drilling rig 210. For example, tactical solution planner 918 may convert the solution into settings for control systems 522, 524, and 526 to accomplish the actual drilling based on the solution. Tactical solution planner 918 may also perform performance optimization to optimizing the overall drilling operation as well as optimizing the drilling itself (e.g., how to drill faster).

Other functionality may be provided by GCL 900 in additional modules or added to an existing module. For example, there is a relationship between the rotational position of the drill pipe on the surface and the orientation of the downhole tool face. Accordingly, GCL 900 may receive information corresponding to the rotational position of the drill pipe on the surface. GCL 900 may use this surface positional information to calculate current and desired tool face orientations. These calculations may then be used to define control parameters for adjusting the top drive 140 to accomplish adjustments to the downhole tool face in order to steer the trajectory of borehole 106.

For purposes of example, an object-oriented software approach may be utilized to provide a class-based structure that may be used with GCL 900 or other functionality provided by steering control system 168. In GCL 900, a drilling model class may be defined to capture and define the drilling state throughout the drilling process. The drilling model class may include information obtained without delay. The drilling model class may be based on the following components and sub-models: a drill bit model, a borehole model, a rig surface gear model, a mud pump model, a WOB/differential pressure model, a positional/rotary model, an MSE model, an active well plan, and control limits. The drilling model class may produce a control output solution and may be executed via a main processing loop that rotates through the various modules of GCL 900. The drill bit model may represent the current position and state of drill bit 148. The drill bit model may include a three dimensional (3D) position, a drill bit trajectory, BHA information, bit speed, and tool face (e.g., orientation information). The 3D position may be specified in north-south (NS), east-west (EW), and true vertical depth (TVD). The drill bit trajectory may be specified as an inclination angle and an azimuth angle. The BHA information may be a set of dimensions defining the active BHA. The borehole model may represent the current path and size of the active borehole. The borehole model may include hole depth information, an array of survey points collected along the borehole path, a gamma log, and borehole diameters. The hole depth information is for current drilling of borehole 106. The borehole diameters may represent the diameters of borehole 106 as drilled over current drilling. The rig surface gear model may represent pipe length, block height, and other models, such as the mud pump model, WOB/differential pressure model, positional/rotary model, and MSE model. The mud pump model represents mud pump equipment and includes flow rate, standpipe pressure, and differential pressure. The WOB/differential pressure model represents draw works or other WOB/differential pressure controls and parameters, including WOB. The positional/rotary model represents top drive or other positional/rotary controls and parameters including rotary RPM and spindle position. The active well plan represents the target borehole path and may include an external well plan and a modified well plan. The control limits represent defined parameters that may be set as maximums and/or minimums. For example, control limits may be set for the rotary RPM in the top drive model to limit the maximum RPMs to the defined level. The control output solution may represent the control parameters for drilling rig 210.

Each functional module of GCL 900 may have behavior encapsulated within a respective class definition. During a processing window, the individual functional modules may have an exclusive portion in time to execute and update the drilling model. For purposes of example, the processing order for the functional modules may be in the sequence of geo modified well planner 904, build rate predictor 902, slide estimator 908, borehole estimator 906, error vector calculator 910, slide planner 914, convergence planner 916, geological drift estimator 912, and tactical solution planner 918. It is noted that other sequences may be used in different implementations.

In FIG. 9, GCL 900 may rely on a programmable timer module that provides a timing mechanism to provide timer event signals to drive the main processing loop. While steering control system 168 may rely on timer and date calls driven by the programming environment, timing may be obtained from other sources than system time. In situations where it may be advantageous to manipulate the clock (e.g., for evaluation and testing), a programmable timer module may be used to alter the system time. For example, the programmable timer module may enable a default time set to the system time and a time scale of 1.0, may enable the system time of steering control system 168 to be manually set, may enable the time scale relative to the system time to be modified, or may enable periodic event time requests scaled to a requested time scale.

Referring now to FIG. 10, a block diagram illustrating selected elements of an embodiment of a controller 1000 for performing surface steering according to the present disclosure. In various embodiments, controller 1000 may represent an implementation of steering control system 168. In other embodiments, at least certain portions of controller 1000 may be used for control systems 510, 512, 514, 522, 524, and 526 (see FIG. 5).

In the embodiment depicted in FIG. 10, controller 1000 includes processor 1001 coupled via shared bus 1002 to storage media collectively identified as memory media 1010.

Controller 1000, as depicted in FIG. 10, further includes network adapter 1020 that interfaces controller 1000 to a network (not shown in FIG. 10). In embodiments suitable for use with user interfaces, controller 1000, as depicted in FIG. 10, may include peripheral adapter 1006, which provides connectivity for the use of input device 1008 and output device 1009. Input device 1008 may represent a device for user input, such as a keyboard or a mouse, or even a video camera. Output device 1009 may represent a device for providing signals or indications to a user, such as loudspeakers for generating audio signals.

Controller 1000 is shown in FIG. 10 including display adapter 1004 and further includes a display device 1005. Display adapter 1004 may interface shared bus 1002, or another bus, with an output port for one or more display devices, such as display device 1005. Display device 1005 may be implemented as a liquid crystal display screen, a computer monitor, a television or the like. Display device 1005 may comply with a display standard for the corresponding type of display. Standards for computer monitors include analog standards such as video graphics array (VGA), extended graphics array (XGA), etc., or digital standards such as digital visual interface (DVI), definition multimedia interface (HDMI), among others. A television display may comply with standards such as NTSC (National Television System Committee), PAL (Phase Alternating Line), or another suitable standard. Display device 1005 may include an output device 1009, such as one or more integrated speakers to play audio content, or may include an input device 1008, such as a microphone or video camera.

In FIG. 10, memory media 1010 encompasses persistent and volatile media, fixed and removable media, and magnetic and semiconductor media. Memory media 1010 is operable to store instructions, data, or both. Memory media 1010 as shown includes sets or sequences of instructions 1024-2, namely, an operating system 1012 and surface steering control 1014. Operating system 1012 may be a UNIX or UNIX-like operating system, a Windows® family operating system, or another suitable operating system. Instructions 1024 may also reside, completely or at least partially, within processor 1001 during execution thereof. It is further noted that processor 1001 may be configured to receive instructions 1024-1 from instructions 1024-2 via shared bus 1002. In some embodiments, memory media 1010 is configured to store and provide executable instructions for executing GCL 900, as mentioned previously, among other methods and operations disclosed herein.

The following disclosure explains additional and improved methods and systems for drilling. In particular, the following systems and methods can be useful to reduce dogleg severity in the wellbore and also obtain more accurate placement of the wellbore. The following methods and systems can be used to drill with less friction, which helps optimize rate of penetration and thus results in less cost to drill the well. It should be noted that the following methods may be implemented by a computer system such as any of those described above. For example, the computer system used to perform the methods described below may be a part of the steering control system 168, a part of the rig controls system 500, a part of the drilling system 100, included with the controller 1000, or may be a similar or different computer system and may be coupled to one or more of the foregoing systems. The computer system may be located at or near the rig site, or may be located at a remote location from the rig site, and may be configured to transmit and receive data to and from a rig site while a well is being drilled. Moreover, it should be noted that the computer system and/or the control system for controlling the variable weight or force may be located in the BHA or near the bit.

SWIFT Drilling

Accurate modelling of the drillstring and automation of the drilling process can be used to allow mud motor drilling to achieve any dogleg severity up to its maximum yield with minimal torque and drag. As used herein, "SWIFT" stands for Sliding With Indexing For Toolface and describes a method whereby the normal slide/rotate patterns of mud motor drilling can be replaced by frequent, regular changes of toolface to fixed values which on average produce the desired dogleg severity in the desired toolface plane. SWIFT drilling techniques can be used to drill the wellpath with less tortuosity than a conventional slide/rotate drilling pattern and can be used to disturb friction rotationally much of the time during drilling and thus help reduce updrag.

Figure 11:
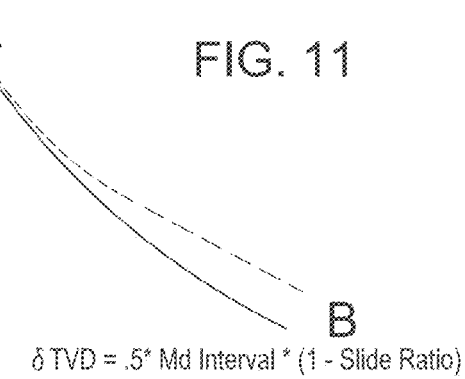
FIG. 11 is a diagram illustrating the Stockhausen Effect.

When a simple slide/rotate drilling pattern is used, it is common to determine a slide of the wellbore 'ratio' and then slide drill only for as much of a stand of pipe as is needed to achieve the desired wellbore curvature, and perform rotary drilling for the rest of the stand. The issues with this are twofold. Firstly, the slide ratio which can be defined as the Planned Dogleg Severity/Motor Yield can be only 50% or even lower. For example, if the well plan requires a dogleg severity (DLS) of 8°/100 ft but the motor is capable of 16°/100 ft, the slide ratio is 50% so the drilling only needs to slide 45 ft of every 90 ft stand of pipe to achieve 8°/100 ft on average. In practice, however, the geometry delivered will be a 16°/100 ft curve for 45 ft and approximately a straight line for 45 ft. This produces a peculiar result when the subsequent surveys are processed. Conventional minimum curvature techniques typically used to locate the wellbore will assume a single arc from A to B producing the solid curved line shown on FIG. 11 but in practice it is the dashed curve with short dashed and the straight long dashed line that were drilled and clearly the position at B in FIG. 11 is different for the two paths. This positional error is known as the Stockhausen Effect. The impact on the calculated wellpath position over an entire build from vertical to horizontal is to accumulate a total TVD Error of $\delta TVD=0.5*Md\ Interval*(1-Slide\ Ratio)$.

If surveys are taken every 90 ft and the slide ratio is 0.5 (50%), one would expect a final TVD error of 0.5*90*(1-0.5)=22.5 ft. If the rotary drilling occurs before the slide drilling, the TVD error is −22.5 ft. Notice that the TVD error is not dependent on the build rate. Larger radii produce smaller errors when going from curve to straight but the length over which the angle is generated is directly proportional to the radius so the net effect cancels out. This is not detectable in the surveys and yet can be a significant error affecting geological modelling and optimal positioning of the wellbore in the target reservoir.

The additional sharp curvature in the wellbore has to be navigated by both the drill pipe and casing in due course, and all downhole tools, including without limitation rotary steering systems, and can have significantly higher torque and drag effects than might be anticipated for a smoother curvature of the wellbore. This sharper curvature reduces the penetration rate, adding to the cost of drilling the well. Further, the penetration rate when sliding is typically two to three times slower than when rotary drilling. In short, if the wellpath is smoother and the drillstring is disturbed rotationally while drilling, the positioning is more accurate, the penetration rate is higher, and the wellbore's completion is easier, and the risk of equipment damage or sticking is greatly reduced.

SWIFT Example One: As a broad description, SWIFT drilling can be viewed as a repeated pattern of frequent toolface settings and spindle rotations to achieve the desired geometry of the wellbore. By sliding and rotating over very short lengths, the net effect is very similar to a smooth curve of a larger radius than the BHA would produce in purely slide mode. This can be illustrated by way of examples.

If one wished to build the wellbore curve at 8°/100 ft with a BHA capable of drilling 16°/100 ft, one could repeat a simple time-based pattern as follows.
  Estimate Reactive Torque (RT) for the desired weight on bit and set the off bottom toolface to Target Toolface+RT.
  Bring up the weight on bit and adjust the spindle until sliding on target toolface begins.
  Rotate at 5 RPM for 12 seconds (i.e., one 360° rotation).
  Slide drill on highside for 12 seconds (observe toolface delivered).
  Repeat the preceding two steps.

Since we can predict the time required for a spindle change at the surface to arrive downhole at the bit, we can start to adjust the one wrap change after that time to maintain target toolface. For example, if the toolface requires a movement to be 10 degrees right of what has been delivered, the one wrap change would actually be 370 degrees instead of 360 degrees. The effect of this process is that the Stockhausen Effect takes place over much shorter intervals and accumulates to effectively zero. If the ROP value was 180 ft/hour, the progress made in 12 seconds is only 7 inches and the curve offset created with a 16°/100 ft DLS is only 7 inches*sin(16*0.006)=$\frac{1}{100}^{th}$ of an inch.

SWIFT Example Two: Suppose one requires a 3°/100 ft dogleg severity from a 16°/100 ft motor. For simplicity, we will assume constant ROP whether rotating or sliding.
  Estimate Reactive Torque (RT) for the desired WOB and set the off bottom toolface to Target Toolface+RT.
  Bring up the weight on bit and adjust the spindle until sliding on target toolface, then
  Slide for 30 seconds
  Rotate at 5 RPM for 15 seconds (i.e., 1.25 wraps)
  Slide for 41 seconds
  Rotate at 5 RPM for 18 seconds (i.e., 1.5 wraps)
  Slide for 41 seconds
  Rotate at 5 RPM for 15 seconds (i.e., 1.25 wraps)
  Repeat the preceding six steps Only the first action is curving the wellbore on target. The first slide for 41 seconds is cancelled out by the second slide for 41 seconds, and in every 160 seconds only 30 seconds of drilling is on target creating a final yield of 3 (assuming constant ROP).

It can be seen therefore that any motor yield is possible by adjusting the amount of time spent on each toolface. However, in practice when changes are made they will not be at constant RPM and the changes take time to propagate downhole. The propagation predictions and reactive torque predictions will not be accurate, the rock hardness will vary, and the toolfaces will be pulsed with a time delay. However SWIFT drilling can provide additional benefits even when these uncertainties exist.

The variations in RPM, the time propagation down hole and the reactive torque, rock hardness, and pulsing delays are likely to be consistent for the duration of drilling a single slide in a single formation so the observed errors can be measured and adjusted accordingly. If the inclination change and azimuth change achieved in a stand indicate a delivered toolface left of target or the pulsed toolfaces indicate a left of target error, the primary stationary spindle position can be adjusted to the right accordingly. If the measured yield is too high, the timing on the offset toolfaces or the time spent rotating can be increased, if too low, they can be increased. In some examples, the following procedures can be automated in whole or in part by a computer system such as any of those described above to implement the SWIFT method of drilling. Initially the system can use the prediction model to estimate the starting parameters at the start of a stand of pipe. These include:

Maximum ROP achievable;
Optimum Weight on Bit (WOB) for maximum ROP;
Expected Reactive Torque (RT) at Optimum WOB;
Expected Differential Pressure (DP) at Optimum WOB;
Spindle Change effect on downhole toolface against time; and
Block Velocity (BV) change effect on weight on bit delivered against time.

Once a starting or initial set of parameters is input, received, or determined by the computer system, it can implement the SWIFT drilling technique and measure the total cycle time required to rotate from one index to the next and adjust the RPM or the slide time until the slide rotate balance matches the right values to produce the desired DLS. In some examples, the SWIFT drilling technique is implemented by performing the following steps:

Begin the slide assuming these values for the starting parameters are correct.
Observe the toolface when stable weight on bit (WOB) is achieved.
Observe the actual time taken for (WOB) to be delivered downhole to the bit.
Determine the spindle change required to correct toolface to target toolface (TgTf).
Apply the spindle change.
Apply a BV change to use RT to correct the anticipated toolface error by the time the Block Velocity change arrives downhole at the bit. This will bring the toolface to target toolface.
Repeat the previous step for the duration of the spindle propagation time for the spindle change to reach the bit and the weight on bit will balance to optimal while the toolface remains approximately on target.
Once stable, use the differential pressure observed to estimate downhole WOB.
Maintain as near constant (WOB) as reasonably as possible, index the spindle by 1.25 wraps and measure actual time needed to make this change. This is included in the accumulated rotary drill time.
Hold Spindle for required time on 90° Right of TgTf.
Index Spindle by 1.5 wraps and hold for required time on 90° Left of TgTf.
Index spindle by 1.25 wraps and hold for required time on TgTf.
Design time on each index to complete the cycle in a selected distance, such as 10 ft.
Ensure the MWD system pulses the previous stable toolface (e.g., determined as a weighted average by stability) along with a time stamp.
Use these toolfaces and the latest assessment of motor yield to estimate well path position.
Determine a new target toolface and yield required and repeat both the stabilization and indexing procedures as may be required with an updated drillstring model based on the observed values for the parameters.

It should be noted that, with a good model of the drillstring, surface sensors can be used to provide data that in turn can be used to estimate other drilling parameters, which can be updated with data received from downhole while drilling. For example, a drillstring model can be used to predict or estimate a current toolface value based on surface torque and standpipe pressure values, with the estimated toolface value updated when a value for the toolface is received at the surface from downhole. The computer system can be programmed with the drillstring model so that initial parameters are updated based on measured values of various drilling parameters (e.g., WOB, ROP, RPM, surface torque, standpipe pressure, differential pressure, toolface, etc.) and are used to automatically estimate updated values as the drilling operations continue. In addition, the computer system can be programmed so that the drillstring model is updated as drilling progresses to more accurately reflect the relationships of one or more drilling parameters to each other. Although a few specific examples are provided here, it should be noted that any combination of these approaches can be used to create a drilling efficiency bias by either targeted drilling efficiency in a target toolface range or by dwelling in a target toolface range to create non-uniform directional progress while reducing overall tortuosity. Examples are also provided with processing and adjustments to parameters being controlled from the surface based on a combination of feedback from models, downhole sensors, and/or surface sensor measurements. It is also possible to implement such a system within a downhole tool system above, below, or embedded into a downhole mud motor system. For instance, a telescoping WOB control system could be used in a complete downhole control loop implementation or in combination with surface controls and sensors.

The computer system may also be programmed to apply a set of rules to prevent damage to the wellbore and/or the drilling rig. The rules may include upper or lower threshold limits for various drilling parameters, or may include target parameter ranges. The computer system can monitor the drilling parameters automatically while drilling progresses to check if any of the parameters exceeds an upper limit, falls below a lower limit, or falls outside a target range. If such an event occurs, the computer system can be programmed to take corrective action, such as by generating an audible or visual alert, sending a message such as an email or text message, and/or adjusting one or more drilling parameters or even shutting down drilling activity in circumstances in which a dangerous condition is determined to exist.

Variable Weight Drilling

As used herein, "VWD" stands for Variable Weight Drilling which describes a method whereby the BHA and drillstring are in constant rotation but as the BHA passes the desired toolface, the weight on bit is increased such that reactive torque slows the BHA revolutions down and on approach to the target toolface, the weight on bit is reduced. This procedure is similar to the SWIFT drilling procedure above, but in this case the drillstring maintains rotational disturbance. This technique can take advantage of processing in the MWD to smooth and pulse the shape of the toolface curve observed downhole. Like the SWIFT drilling techniques described above, VWB techniques can be used to minimize tortuosity of the wellbore and can be used to minimize friction and updrag.

Figure 12:
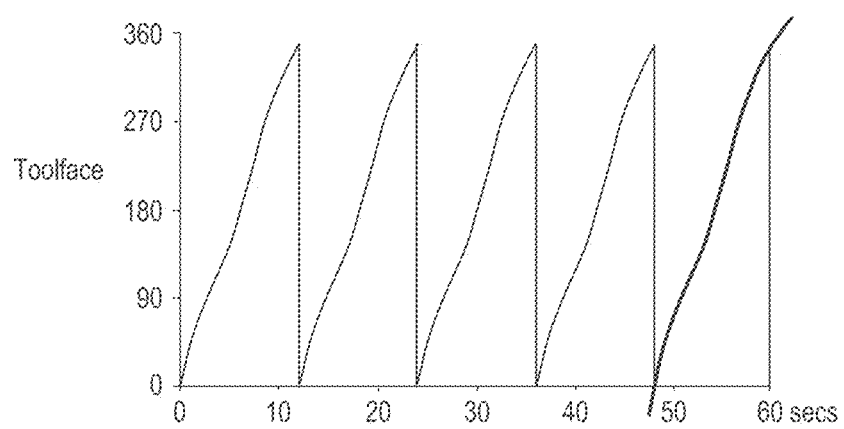
FIG. 12 is an illustration of toolface values over time.

In the curve shown in FIG. 12, it can be seen that the toolface observations when rotating are noisy with high frequency vibration, some outliers in the data, and some evidence of a slow frequency drillstring vibration. By smoothing the data, a fitted function can be derived over the period indicated by the bold line. The MWD data can be pulsed to surface, including the phase and the key function parameters for the best fit over the last several periods. The period itself will average at the spindle period. This can be in the form: Absolute time at 0 for last zero observation, with Polynormal parameters a, b and c describing the fit curve in the form Toolface=$at^4+bt^3+ct^2+dt+e$, where a, b, c, d, and e are the parameters and t is the time since the start of the period. One can assume the first observation is 0 and the last is 360, so d and e can be derived and need not be pulsed to the surface.

The effective yield on a target toolface when drilling on any other toolface is the yield*cos(Toolface−Target Toolface).

Figure 13:
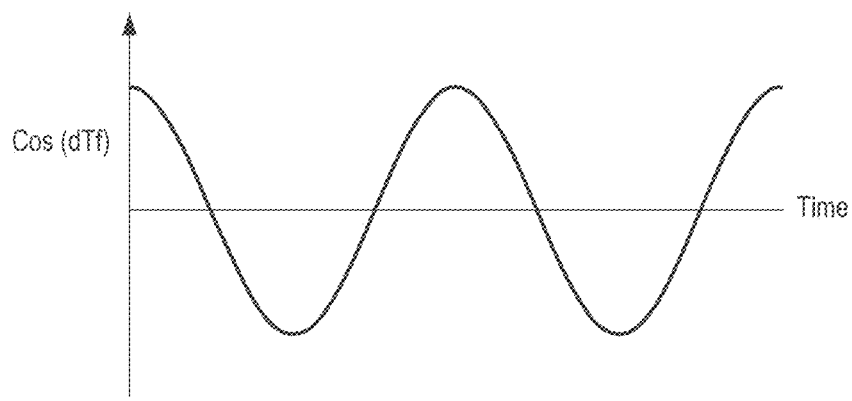
FIG. 13 is an illustration of the cosine function of the change in toolface over time.

The pulsed toolface values can be observed while rotating and fit a cos(Toolface-Target Toolface) versus time smoothed curve to best match the frequency (but not the phase) of the spindle RPM, such as shown in FIG. 13.

Figure 14:
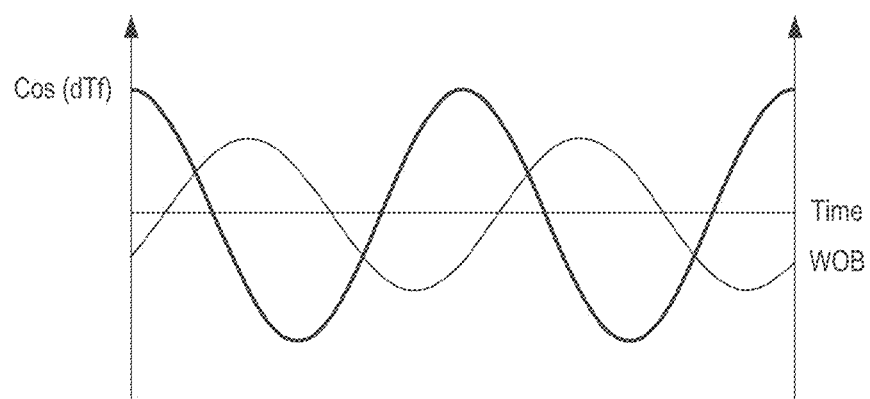
FIG. 14 is an illustration of the cosine function of the change in toolface over time and the weight on bit over time.

Allowing for the anticipated time required for a block velocity change to propagate downhole to the bit if a variation in block velocity is applied, one can superimpose a weight on bit pattern which can be converted to an anticipated pattern of consequent reactive torque, such as shown in FIG. 14.

In FIG. 14, the thin line shows the weight on bit pattern over time. With weight on bit rising, the reactive torque has a negative effect on toolface. When the weight on bit is falling, this has a positive effect on toolface.

Figure 16:
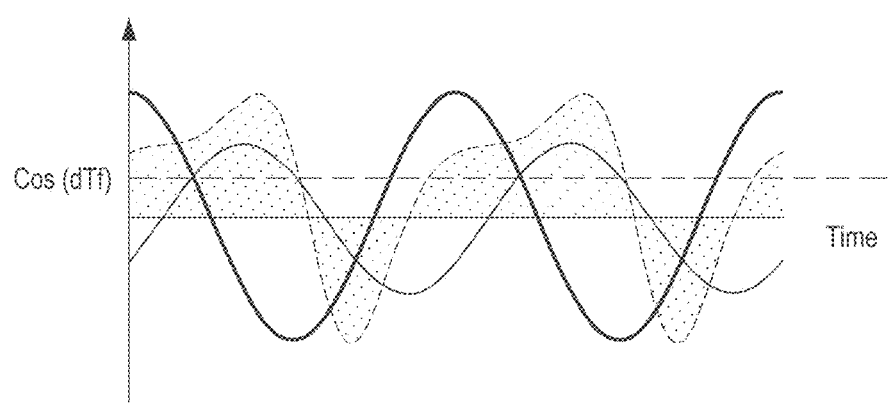
FIG. 16 is an illustration of the cosine of toolface and reactive torque over time (together with the cosine of change in toolface and the weight on bit changes over time), showing an average cosine (toolface) as well.

When these two effects on toolface are combined, a new waveform is generated for the toolface curve downhole and consequently for the cosine of the resultant toolface, such as shown in FIG. 16.

Figure 15:
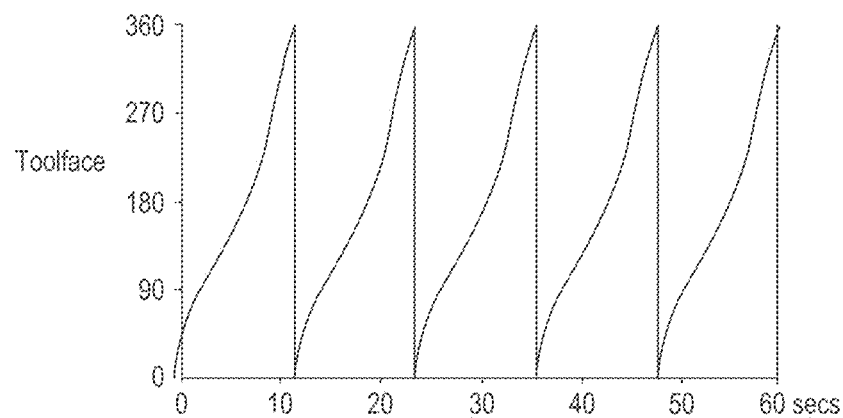
FIG. 15 is an illustration of the effects of the weight on bit changes on time on the toolface value over time.

FIG. 15 shows the effect of superimposing a weight on bit pattern on the original toolface curve. The BHA spends more time close to the target toolface and rapidly passes through the opposite quadrants. The function parameters will change with the consequent effect on the cosine curves.

FIG. 16 shows the cos(toolface+Reactive Torque) and is the curve drawn with a short dashed line with dot shading underneath, with the new average cos(toolface) shown by the long dashed line in FIG. 16.

As indicated in FIG. 16, the new average creates a yield bias in the direction of the target toolface. With careful balancing of the amplitude and phase of the imposed weight on bit pattern, it is possible to produce a symmetry that maximises yield in any desired direction or cancels it completely.

Figure 17:
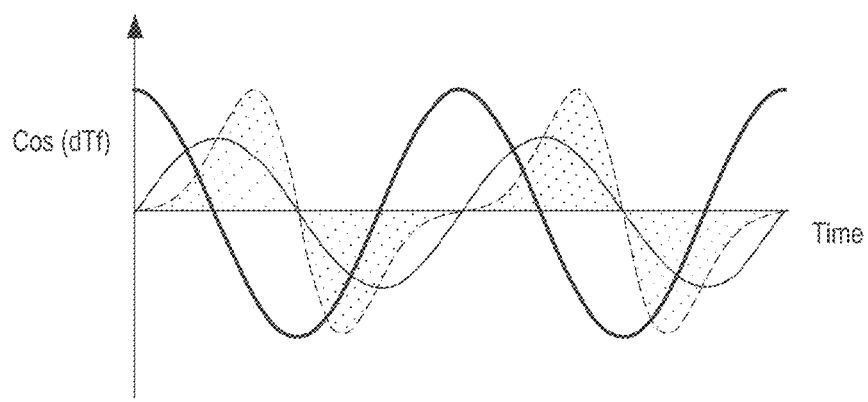
FIG. 17 is an illustration of a minimum yield for drilling when the weight on bit arrives 90 degrees from the spindle phase.

FIG. 17 shows the minimum yield when the weight on bit arrives 90 degrees from the spindle phase.

Figure 18:
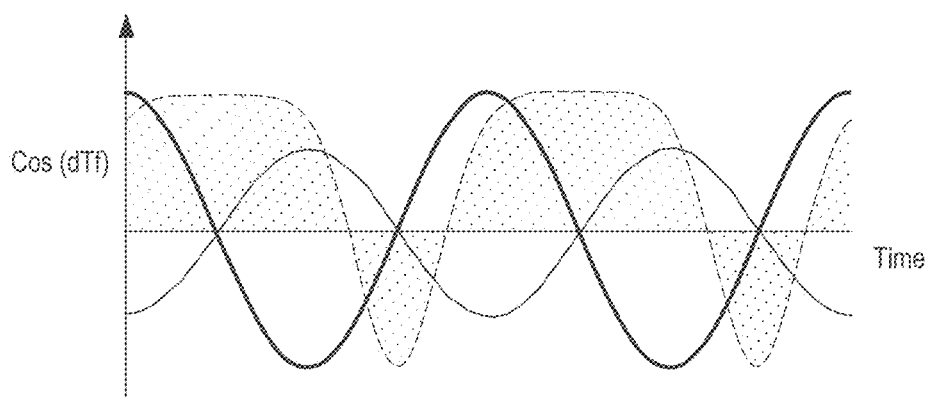
FIG. 18 is an illustration of a maximum yield for drilling when the weight on bit arrives 180 degrees from the spindle phase.

FIG. 18 shows the maximum yield when weight arrives 180 degrees from spindle phase, with the effect that when the toolface passes beyond the target, the weight on bit is increased to increase the reactive torque and keep the toolface closer to target, and on approach to target the weight on bit is decreased to speed up progress towards the target toolface. This approach maintains a rotary motion of the drillstring, thereby breaking friction and increasing ROP.

Figure 19:
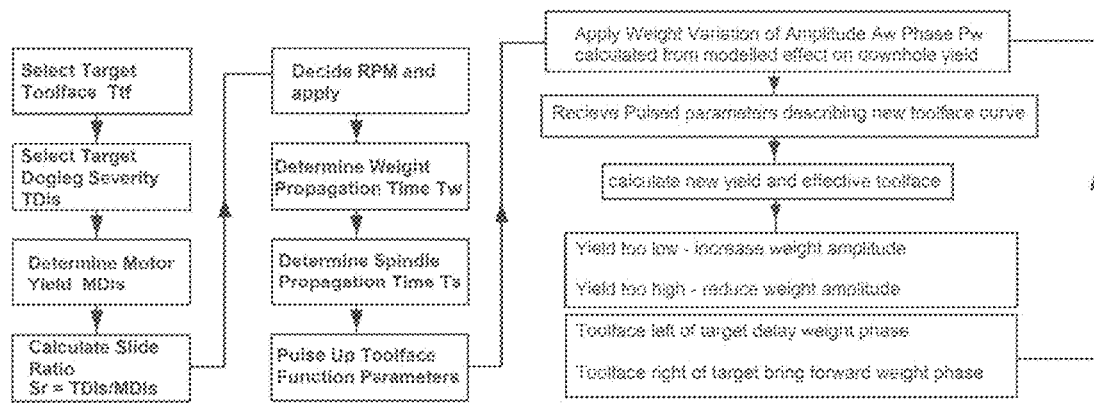
FIG. 19 is a block diagram illustrating the steps that may be taken with the VWD methods and systems disclosed herein.

FIG. 19 shows a block diagram of the sequence of events for one embodiment of VWD.

It is to be noted that the foregoing description is not intended to limit the scope of the claims. For example, it is noted that the disclosed methods and systems include additional features and can use additional drilling parameters and relationships beyond the examples provided. The examples and illustrations provided in the present disclosure are for explanatory purposes and should not be considered as limiting the scope of the invention, which is defined only by the following claims.

What is claimed is:

1. A computer system for controlling drilling of a wellbore, the computer system comprising:
   a processor;
   a memory coupled to the processor, wherein the memory comprises instructions executable by the processor, the instructions comprising instructions for:
   (a) determining a target toolface for a slide drilling operation;
   (b) determining a target dogleg severity for a portion of a wellbore being drilled;
   (c) determining a motor yield for a bottom hole assembly (BHA) for drilling the wellbore for the slide drilling operation;
   (d) responsive to the target dogleg severity and the motor yield, determining a slide ratio for the slide drilling operation;
   (e) responsive to the slide ratio, determining revolutions per minute for a drillstring for the slide drilling operation;
   (f) determining a time for a weight on bit (WOB) change to reach a drill bit attached to the BHA;
   (g) determining the time for a spindle change to reach the drill bit;
   (h) receiving, from a sensor, toolface information during the slide drilling operation;
   (i) determining an expected yield from a plurality of potential WOB amplitudes and phases; and
   (j) adjusting a WOB, wherein adjusting the WOB further comprising applying the adjusted WOB with a highest expected yield to the BHA of the drill string drilling the wellbore;
   (k) controlling the drilling of the wellbore at the adjusted WOB.

2. The computer system according to claim 1 further comprising instructions for repeating steps (h)-(k) a plurality of times during drilling of the wellbore.

3. The computer system according to claim 2, further comprising instructions for:
   (l) determining an updated yield associated with the first WOB amplitude and the first WOB amplitude; and
   (m) adjusting the WOB amplitude if the updated yield falls below a minimum, exceeds a maximum, or falls outside a target range therefor.

4. The computer system according to claim 3, further comprising instructions for:
   (n) determining an updated toolface; and
   (o) adjusting the WOB phase if the updated toolface is left of target, right of target, or falls outside a target range therefor.

5. The computer system according to claim 4, wherein adjusting the WOB amplitude comprises increasing WOB amplitude if the updated yield falls below a threshold therefor.

6. The computer system according to claim 5, wherein adjusting the WOB amplitude comprises decreasing WOB amplitude if the updated yield exceeds a threshold therefor.

7. The computer system according to claim 6 wherein adjusting the WOB phase comprises delaying the WOB phase if toolface is left of a target toolface.

8. The computer system according to claim 7 wherein adjusting the WOB phase comprises bringing the WOB phase forward if toolface is right of the target toolface.

9. The computer system according to claim 8, further comprising instructions for repeating steps (a)-(o) a plurality of times during drilling of a wellbore.

10. A non-transitory, computer-readable medium storing a plurality of instructions that, when executed by one or more processors of a computing device, cause the one or more processors to perform operations for controlling drilling operations comprising:

(a) determining a target toolface for a slide drilling operation;
(b) determining a target dogleg severity for a portion of a wellbore being drilled;
(c) determining a motor yield for a bottom hole assembly (BHA) for drilling the wellbore for the slide drilling operation;
(d) responsive to the target dogleg severity and the motor yield, determining a slide ratio for the slide drilling operation;
(e) responsive to the slide ratio, determining revolutions per minute for a drillstring for the slide drilling operation;
(f) determining a time for a weight on bit (WOB) change to reach a drill bit attached to the BHA;
(g) determining the time for a spindle change to reach the drill bit;
(h) receiving, from a sensor, toolface information during the slide drilling operation;
(i) determining an expected yield from a plurality of potential WOB amplitudes and phases;
(j) sending a signal to a drilling system to apply a first WOB amplitude and first WOB phase associated with a highest expected yield to the BHA of the drill string drilling the wellbore;
(k) determining an updated yield associated with the first WOB amplitude and the first WOB amplitude;
(l) adjusting the WOB amplitude if the updated yield falls below a minimum, exceeds a maximum, or falls outside a target range therefor; and
(m) controlling the drilling of the wellbore at the adjusted WOB.

11. The non-transitory, computer-readable medium of claim 10, wherein the operations further comprise repeating steps (h)-(m) a plurality of times during drilling of the wellbore.

12. The non-transitory, computer-readable medium of claim 11, wherein the operations further comprise:
(n) determining an updated toolface; and
(o) adjusting the WOB phase if the updated toolface is left of target, right of target, or falls outside a target range therefor.

13. The non-transitory, computer-readable medium of claim 12, wherein adjusting the WOB amplitude comprises increasing WOB amplitude if the updated yield falls below a threshold therefor.

14. The non-transitory, computer-readable medium of claim 13, wherein adjusting the WOB amplitude comprises decreasing WOB amplitude if the updated yield exceeds a threshold therefor.

15. The non-transitory, computer-readable medium of claim 14 wherein adjusting the WOB phase comprises delaying the WOB phase if toolface is left of a target toolface.

16. The non-transitory, computer readable medium of claim 15 wherein adjusting the WOB phase comprises bringing the WOB phase forward if toolface is right of the target toolface.

17. The non-transitory, computer-readable medium of claim 16, wherein the operations further comprise repeating steps (a)-(o) a plurality of times during drilling of a wellbore.

18. The non-transitory, computer-readable medium of claim 11, wherein adjusting the WOB amplitude if the updated yield falls below a minimum, exceeds a maximum, or falls outside a target range therefor, further comprising adjusting the WOB amplitude while maintaining a rotary motion of the drillstring.

19. A computer executable method for controlling drilling of a wellbore, the method comprising:
(a) determining, by a computer system coupled to a drilling rig, a target toolface for a bottom hole assembly (BHA) located in the wellbore for a slide drilling operations;
(b) determining, by the computer system, a target dogleg severity for a portion of the wellbore;
(c) determining, by the computer system, a motor yield for the BHA for drilling the wellbore;
(d) responsive to the target dogleg severity and the motor yield, determining a slide ratio for the slide drilling operation;
(e) responsive to the slide ratio, determining revolutions per minute for a drillstring for the slide drilling operation;
(f) determining a time for a weight on bit (WOB) change to reach a drill bit attached to the BHA;
(g) determining the time for a spindle change to reach the drill bit;
(h) receiving, from a sensor, the toolface information during the slide drilling operation;
(i) determining an expected yield from a plurality of potential WOB amplitudes and phases; and
(j) sending a signal to a drilling system to apply a first WOB amplitude and first WOB phase associated with a highest expected yield to the BHA of the drill string during the slide drilling operation; and
(k) using the adjusted WOB for the slide drilling operation.

20. The computer executable method of claim 19, further comprising repeating steps (h)-(k) a plurality of times during drilling of the wellbore.

* * * * *

UNITED STATES PATENT AND TRADEMARK OFFICE
CERTIFICATE OF CORRECTION

| | | |
|---|---|---|
| PATENT NO. | : 12,241,359 B2 | Page 1 of 1 |
| APPLICATION NO. | : 18/329113 | |
| DATED | : March 4, 2025 | |
| INVENTOR(S) | : Angus Lamberton Jamieson | |

It is certified that error appears in the above-identified patent and that said Letters Patent is hereby corrected as shown below:

In the Claims

In Claim 3, Column 28, Line 36 delete "first" and insert -- adjusted --.

In Claim 3, Column 28, Line 37 after "WOB amplitude" delete "and the first WOB amplitude".

In Claim 10, Column 29, Line 28 after "WOB amplitude and the first WOB" delete "amplitude" and insert -- phase --.

Signed and Sealed this
Twenty-seventh Day of May, 2025

Coke Morgan Stewart
*Acting Director of the United States Patent and Trademark Office*